United States Patent
DiLuigi

(10) Patent No.: US 8,205,510 B2
(45) Date of Patent: Jun. 26, 2012

(54) HAND BRAKE TORQUE INPUT COUPLER AND INDICATOR

(75) Inventor: Michael DiLuigi, Alpharetta, GA (US)

(73) Assignee: Diluigi and Associates, LLC, Alpharetta, GA (US)

( * ) Notice: Subject to any disclaimer, the term of this patent is extended or adjusted under 35 U.S.C. 154(b) by 288 days.

(21) Appl. No.: 12/589,731

(22) Filed: Oct. 27, 2009

(65) Prior Publication Data

US 2011/0094313 A1   Apr. 28, 2011

(51) Int. Cl.
*B25B 23/14* (2006.01)
(52) U.S. Cl. .................................................. 73/862.21
(58) Field of Classification Search ............. 73/862.08, 73/862.21–862.22
See application file for complete search history.

(56) References Cited

U.S. PATENT DOCUMENTS

| | | | |
|---|---|---|---|
| 3,679,808 A * | 7/1972 | Rohner et al. | 73/862.46 |
| 4,680,975 A * | 7/1987 | Dodt | 73/862.09 |
| 5,152,071 A * | 10/1992 | Bergeron | 33/530 |
| 6,213,148 B1 * | 4/2001 | Wadsworth et al. | 137/556 |
| 6,427,542 B1 * | 8/2002 | Nicot | 73/862.326 |
| 6,575,042 B1 | 6/2003 | Rinner | |
| 6,799,480 B1 | 10/2004 | Walsh et al. | |
| 7,296,810 B2 * | 11/2007 | Thannikary et al. | 280/93.5 |
| 7,497,408 B2 * | 3/2009 | Lim et al. | 248/284.1 |
| 7,791,362 B2 * | 9/2010 | Hagihara | 324/750.01 |

* cited by examiner

*Primary Examiner* — Max Noori
(74) *Attorney, Agent, or Firm* — Michael J. Bootcheck, LLC

(57) ABSTRACT

A hand brake torque input indicator arrangement for detecting and indicating a torque of rotating mechanical components has an indicator provided between two rotatable bodies, a shaft and a wheel, which are coupled to the indicator so that a torque acting on the shaft by the wheel or vice versa can be indicated.

23 Claims, 21 Drawing Sheets

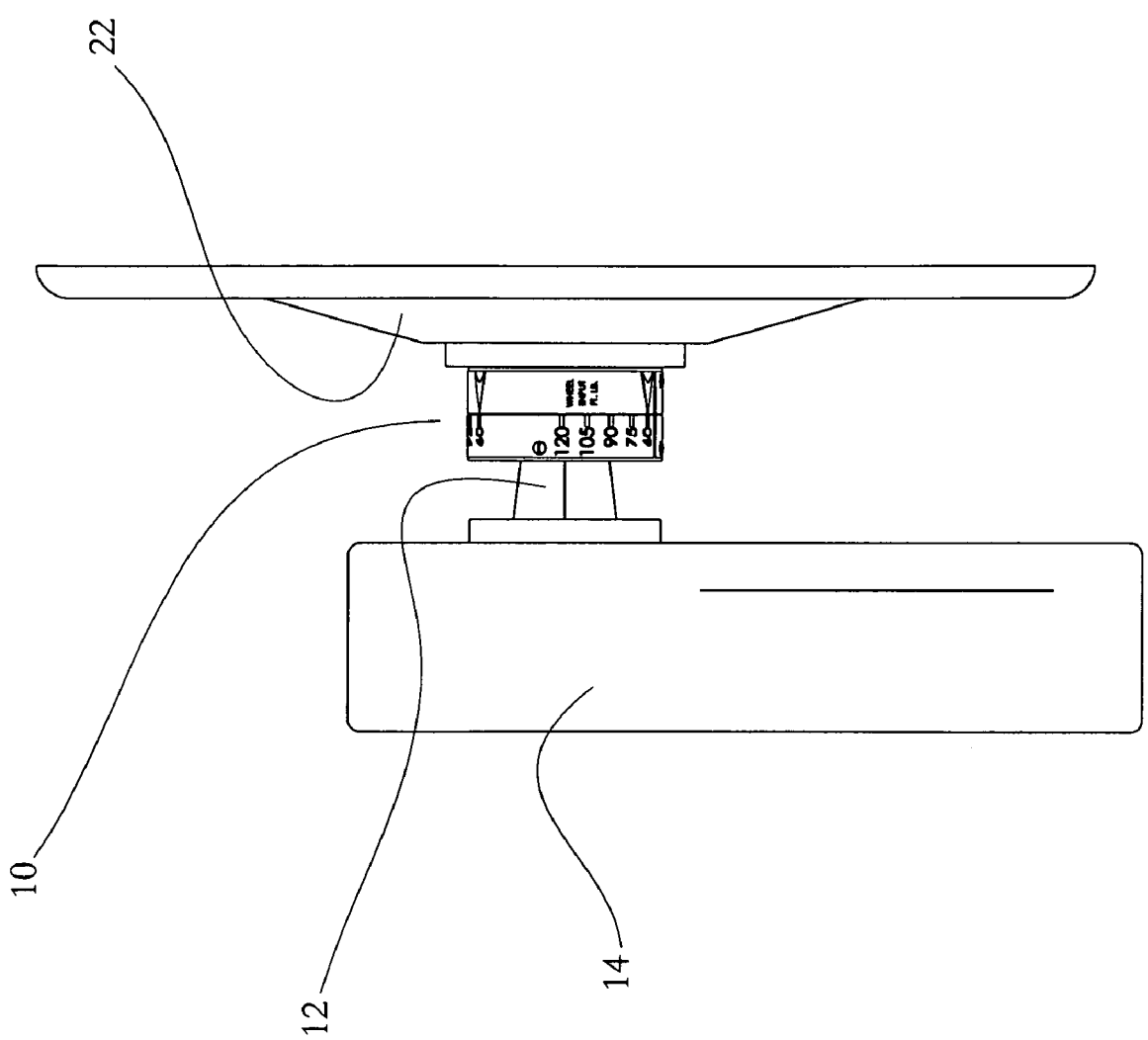

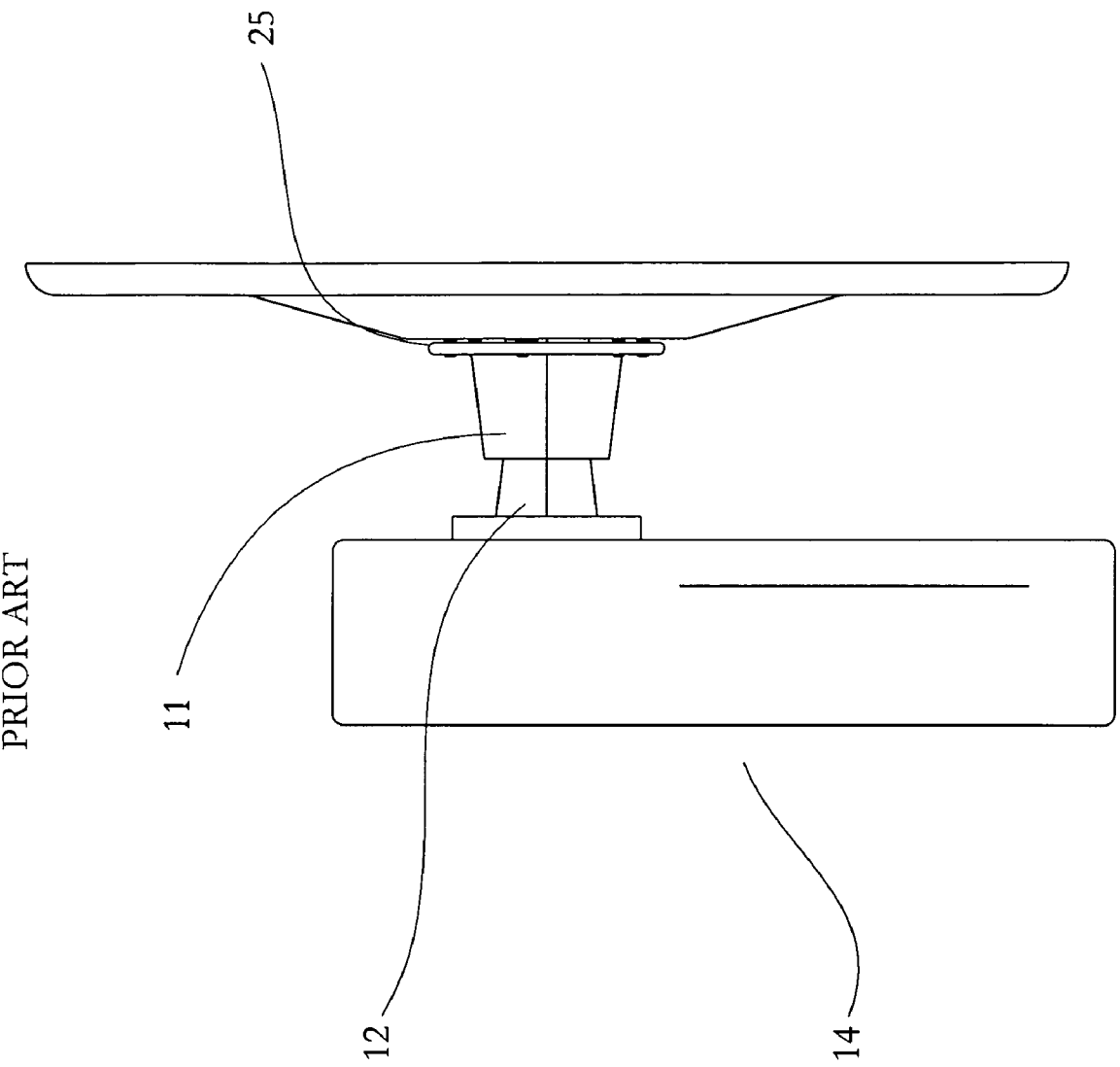

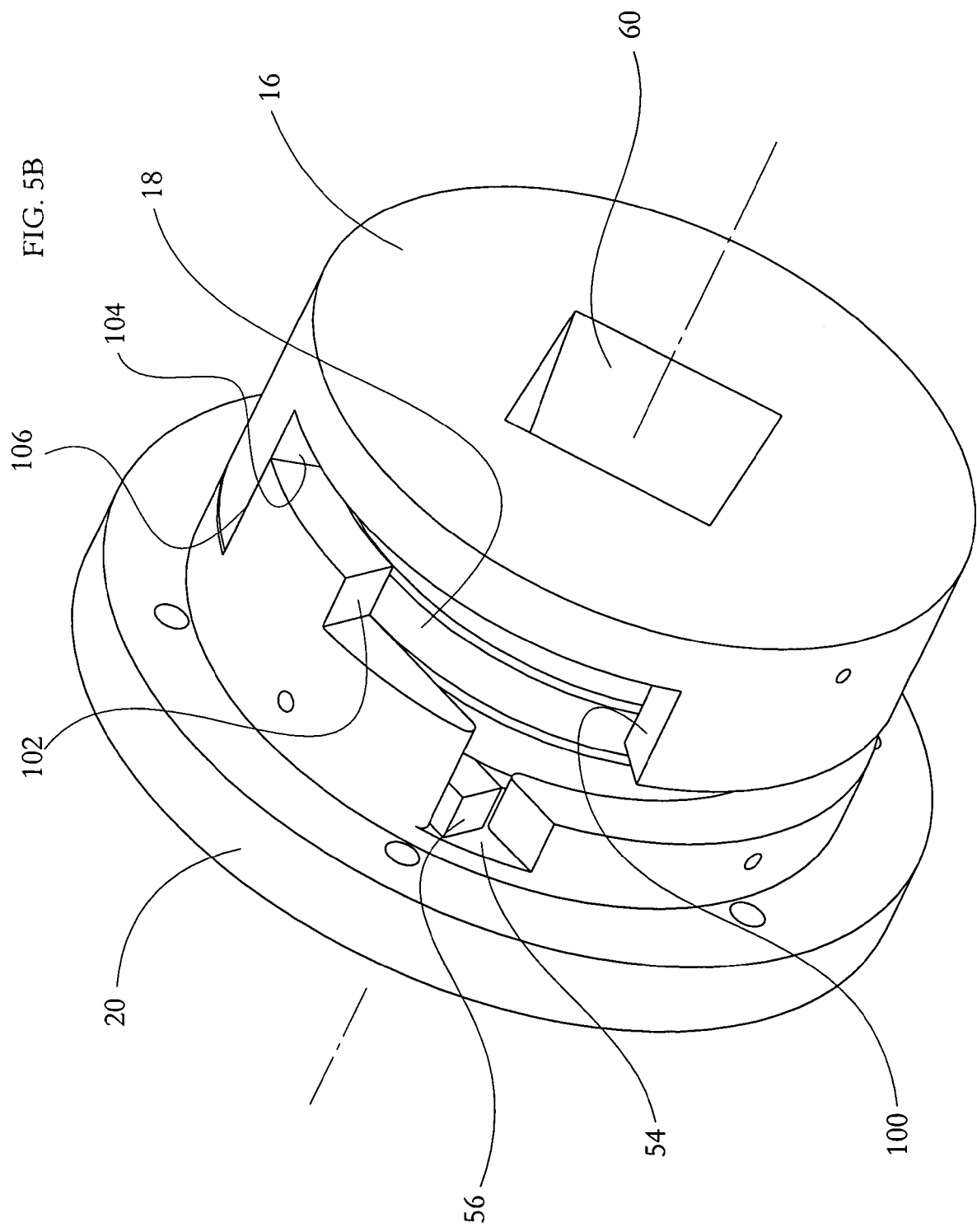

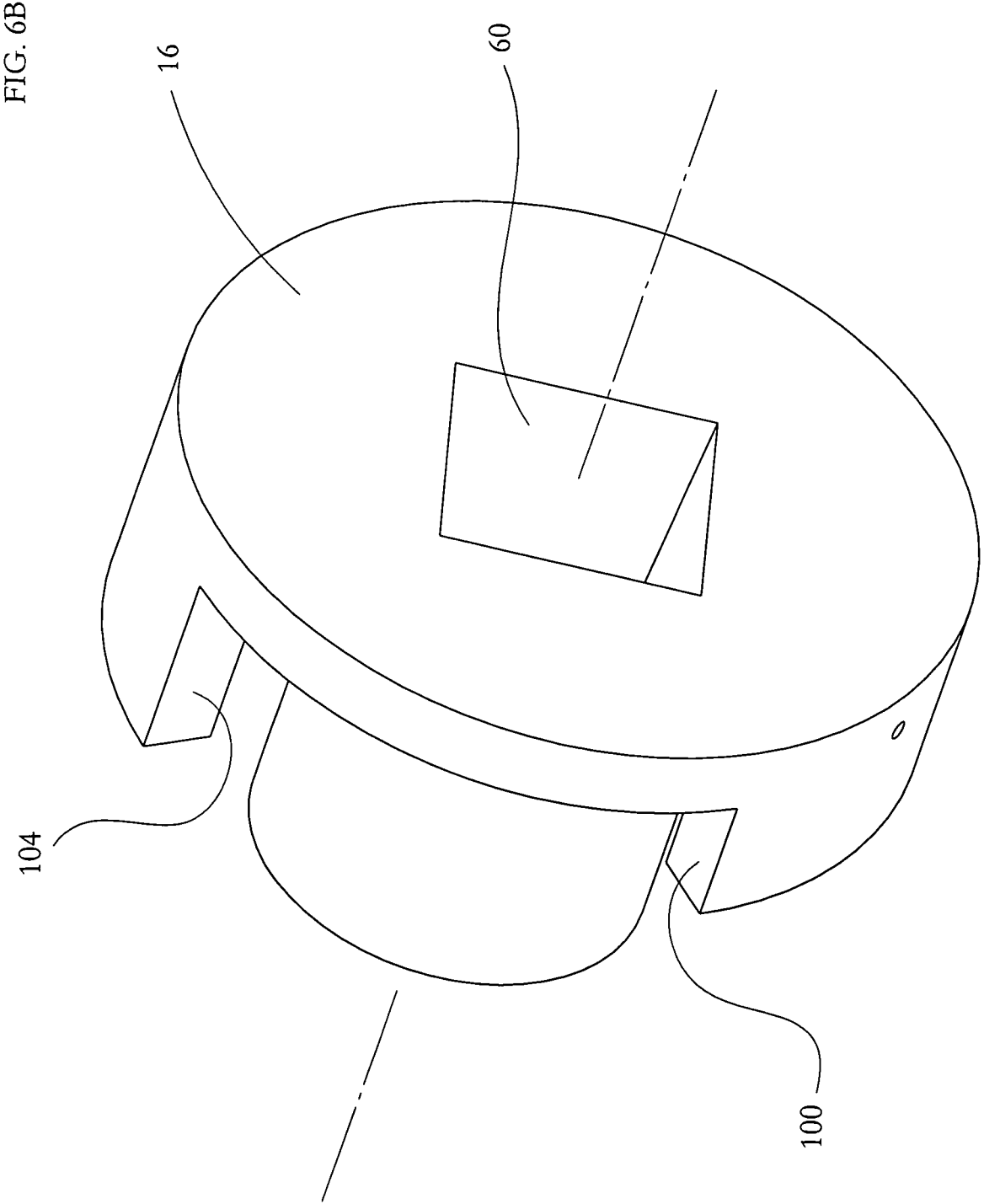

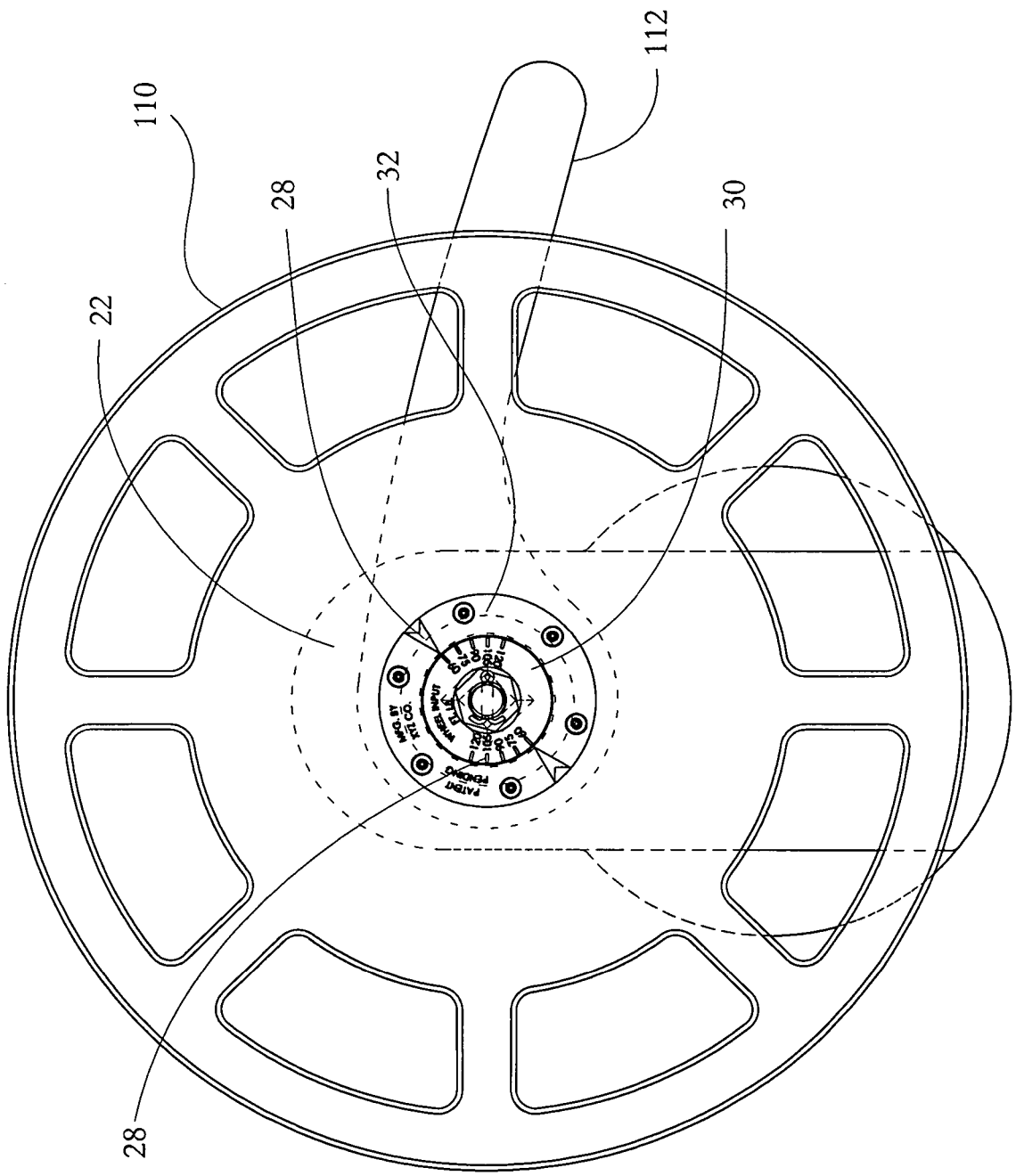

HAND BRAKE TORQUE INPUT COUPLER AND INDICATOR

FIELD OF THE INVENTION

This invention relates to a torque indicator between two rotatable members/shafts. More particularly, the invention relates to a hand brake torque indicator reporting a torque differential for use with rail cars.

BACKGROUND OF THE INVENTION

Across the nation, both persons and goods are always in need of transportation. Various modes are available to transport persons and goods from one location to another including air, rail, road, water, cable, pipeline and space. A mode of transport is a technological solution that makes use of a particular type of vehicle, infrastructure and operation. The transport of a person or of cargo may involve one mode or several modes, with the latter case being called intermodal or multimodal transport. Each mode has its advantages and disadvantages, and a particular mode will be chosen for a trip on the basis of cost, capability, route, and speed.

For the transport of goods across the United States, the transport is usually accomplished either by rail (freight trains) or highway (tractor trailer). In evaluating which mode of transport to use, the advantages and disadvantages of both must be compared. An advantage for rail transport is that it is capable of high capacity and is energy efficient, while a disadvantage is that it lacks flexibility and is capital intensive. The energy efficiency advantage occurs as a result of the rolling stock, which is fitted with metal wheels, moving with low frictional resistance when compared with road vehicles. Further, power may be provided by a steam engine, diesel engine or electrical transmission. Freight trains in particular can be highly economical, with economy of scale and high energy efficiency. Authorities often encourage the use of cargo rail transport due to its environmental profile.

The energy efficiency has been noted by the Association of American Railroads, which has documented that (with current technology), for every 27 gallons of diesel consumed by trucks to haul one ton of freight, railroads use only seven gallons to reach a similar distance. As part of its "Freight Railroads Go the Distance" campaign, the association notes that in 2007, U.S. railroads moved a ton of freight an average of 436 miles per each gallon of fuel, a 3.1 percent improvement vs. 2006 and an 85.5 percent improvement versus 1980, the AAR said. Railroads continue to take steps to further reduce fuel consumption and air emissions, such as by working with suppliers to develop technologies that reduce locomotive idling, as well as hybrid and gen-set switchers for yards, and other hybrid and fuel-cell locomotives, the association said. Given its dramatic energy efficiency over other modes of transport, it is likely that freight transport via rail will continue to increase for decades to come.

As in any endeavor, there are certain risks and dangers inherent in rail travel. These risks occur both while the train cars are in motion and when they are still. Particularly dangerous situations are created when one or more cars are supposed to be in a stationary position, such as in rail yards, hubs, and other locations. Frequently, one or more cars may be peeled off of a train for short term or long term storage. When the cars are cut from the train, a hand brake is applied (typically via a hand wheel or lever) to engage a brake on the car to prevent unwanted movement of the rail car. In practice, a person engages the hand wheel/lever to apply a torque to a shaft, which in turn engages the brake system. To date, there is no means available for the user to ascertain how much torque has been applied to the shaft, and in turn, to the brake system. All too frequently, too little torque is applied and the rail cars move prematurely and unexpectedly. Many times, the result is a runaway car(s), an event that happens daily. As even an unloaded rail car can weigh in excess of 60,000 pounds (and in excess of 286,000 pounds or more if there are goods in the rail car which is common in cut car(s)), significant damage can be caused to persons, goods, and other rail equipment that is impacted by the runaway cars(s). Unfortunately, impacts with humans occur with regularity and often result in substantial injuries or death. What is needed is an effective means for a user to ascertain how much torque is applied to the shaft/brake system. Another benefit of ascertaining the amount of torque is to prevent a user from applying an unnecessarily high torque wherein such an application of torque may result in injuries to the user through over exertion, etc. or to the brake system itself.

SUMMARY OF THE INVENTION

The present invention is directed to a novel torque indictor for a hand brake on a freight car, the torque indicator comprising: a first rotatable member having a first end, a second end, a first member cross sectional shape, and a central axis about which the first rotatable member is able to pivot, a second rotatable member having a first end, a second end, a second member cross sectional shape, and a central axis about which the second rotatable member is able to pivot, a coupler engaged with both the first rotatable member and the second rotatable member wherein the coupler indicates a torque between the first rotatable member and the second rotatable member when at least one of the first rotatable member and the second rotatable member is pivoted with respect to the other via the coupler, wherein the coupler has a first end and a second end spaced a distance from the coupler first end and wherein the coupler has a central axis. The devices may be constructed to various dimensions and configurations to fit into a multitude of locations. The present invention provides a hand brake torque indicator which is particularly suitable for railroad use for freight cars, passenger cars and locomotives and may be installed for new cars or retrofitted into existing cars with various installations including, but not limited to, those with hand wheel and lever activated hand brake systems.

According to one exemplary embodiment of the present invention, the device comprises, in combination with a rotatably driven shaft, a hand wheel assembly for manually turning of the shaft, and a coupler for coupling the hand wheel assembly with the shaft wherein the coupler indicates a torque between the hand wheel assembly and the shaft.

In another exemplary embodiment, the device comprises a torque indictor for a hand brake, the torque indicator comprising: A torque indictor for a hand brake, said torque indicator comprising: a coupler mountable with both a first rotatable member and a second rotatable member, the coupler having at least one torsional element which is engaged with both the first rotatable member and the second rotatable member wherein the coupler indicates a torque between the first rotatable member and the second rotatable member.

In another exemplary embodiment, the device reports and/or indicates a torque differential between two rotatable shafts, the device comprises a first rotatable shaft, a second rotatable shaft, a coupler connecting the first rotatable shaft and the second rotatable shaft having at least one torsional element, wherein as first rotatable shaft is rotated, it becomes constrained and wherein below a minimum activating torque, as the second rotatable shaft is pivoted, the first rotatable shaft is caused to pivot or rotate without additional torque above the minimum activating torque between the first and second rotatable shafts.

BRIEF DESCRIPTION OF THE FIGURES

FIG. 1A illustrates a side view of an exemplary embodiment of the present invention;

FIG. 1B illustrates a side view of a prior art handwheel configuration;

FIG. 5B illustrates another perspective view of the exemplary embodiment of FIG. 5A;

FIG. 6B illustrates another perspective view of the first coupler member of FIG. 6A;

FIG. 12 illustrates an end view of an exemplary embodiment of the present invention with a handwheel or lever.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Figure 2A:
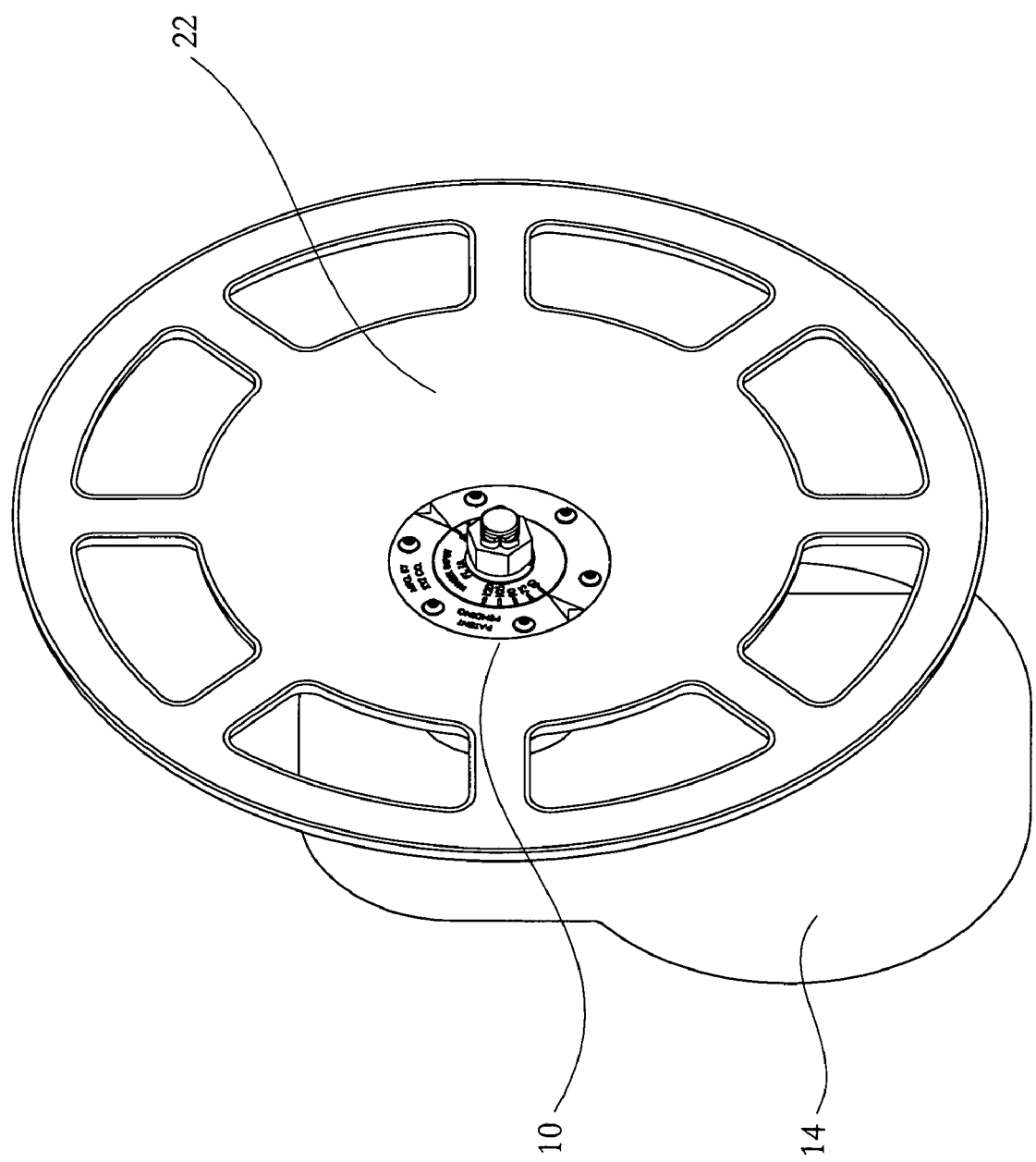
FIG. 2A illustrates a perspective view of an exemplary embodiment of the present invention.
Figure 2B:
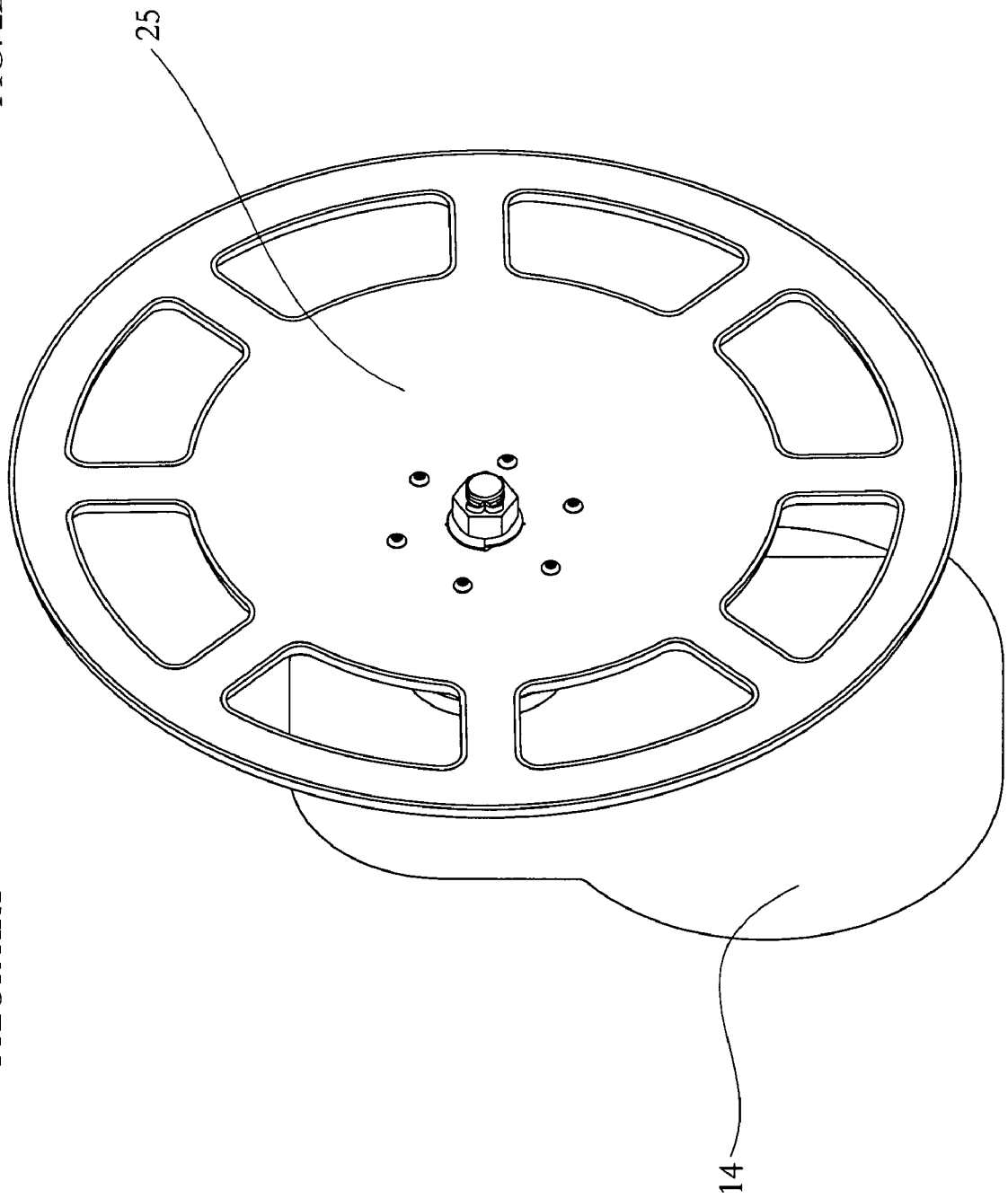
FIG. 2B illustrates a perspective view of a prior art handwheel configuration.
Figure 3:
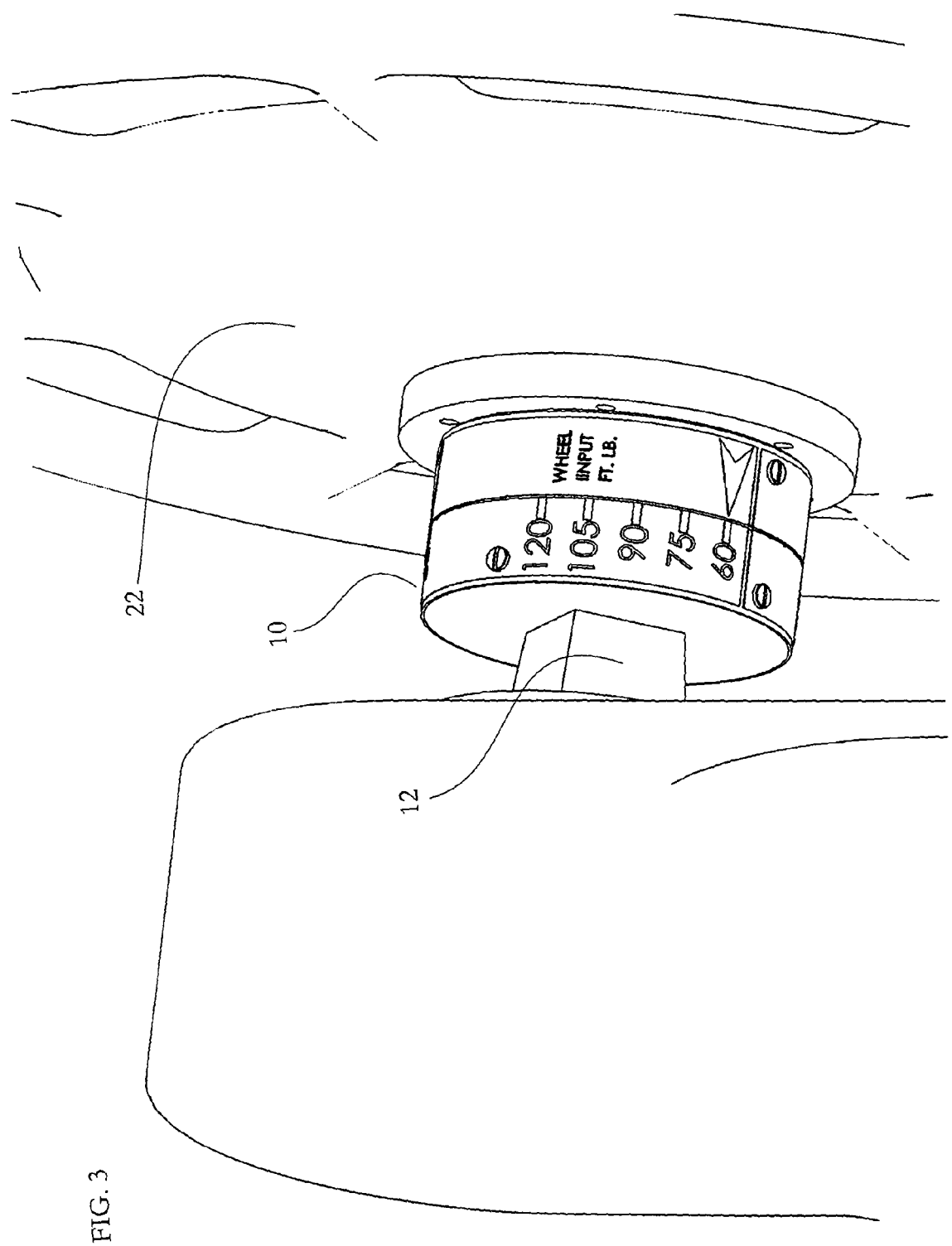
FIG. 3 illustrates an exploded partial perspective view of an exemplary embodiment of the present invention.
Figure 4:
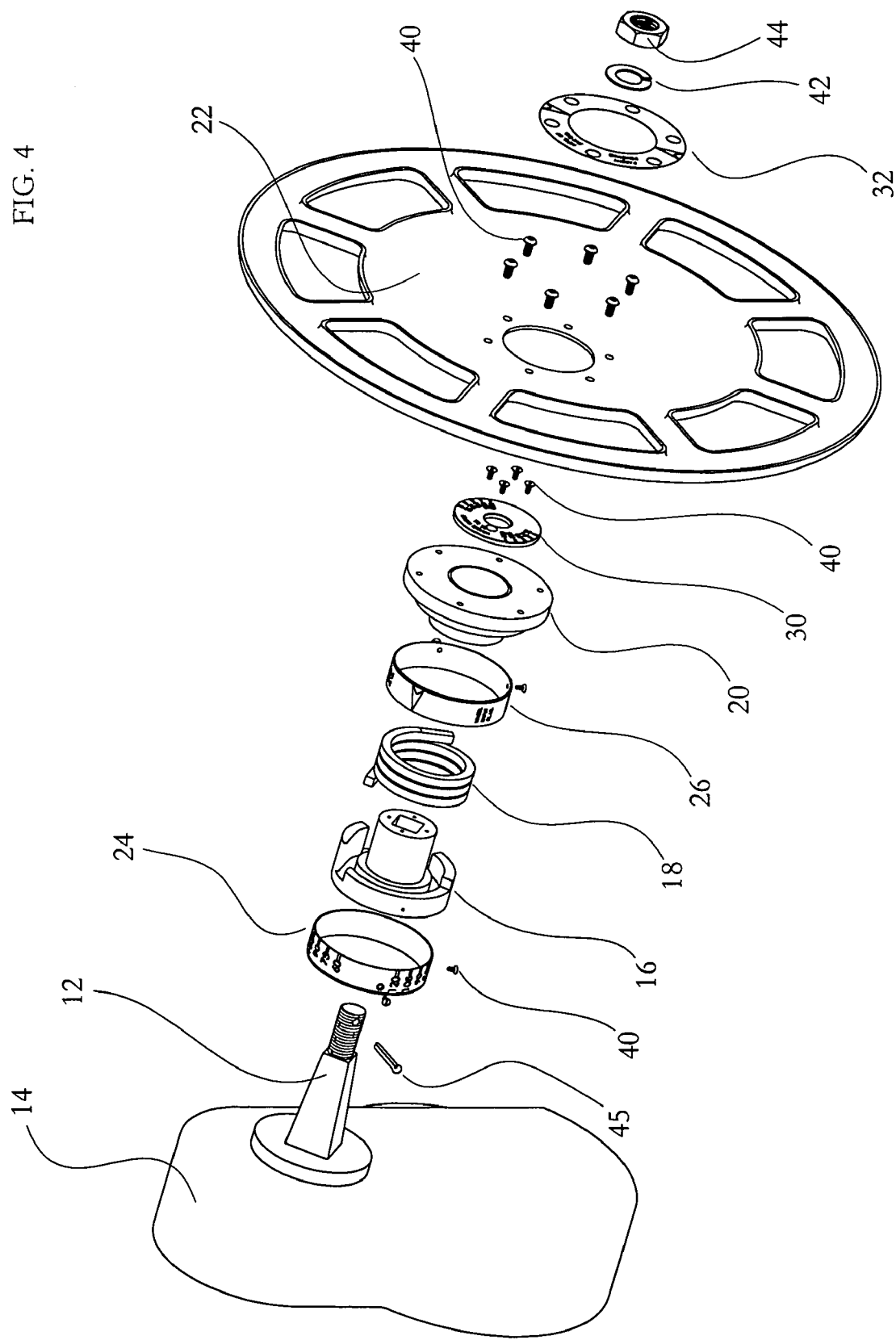
FIG. 4 illustrates an exploded perspective view of an exemplary embodiment of the present invention.
Figure 5A:
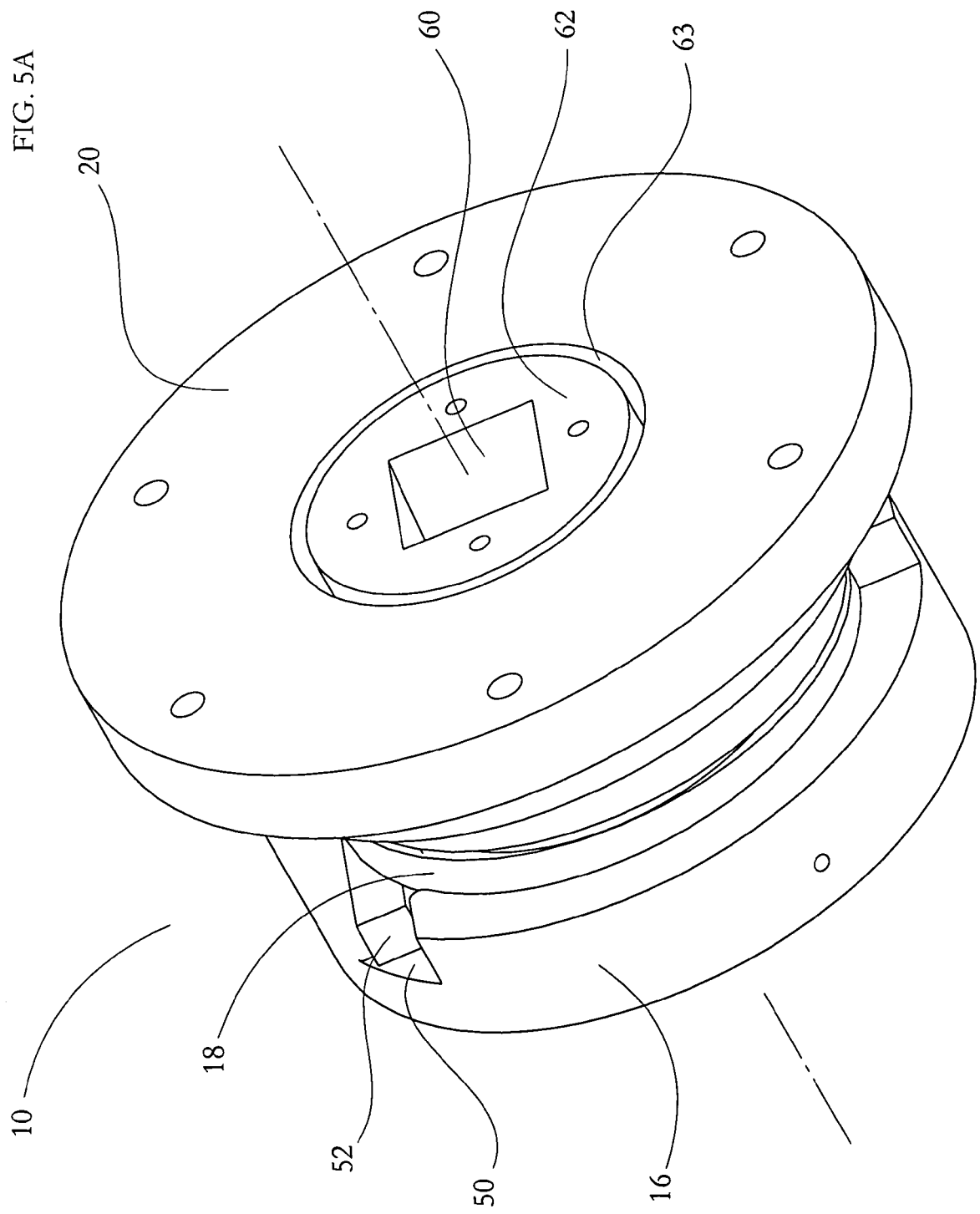
FIG. 5A illustrates a perspective view of an exemplary embodiment of the present invention.
Figure 6A:
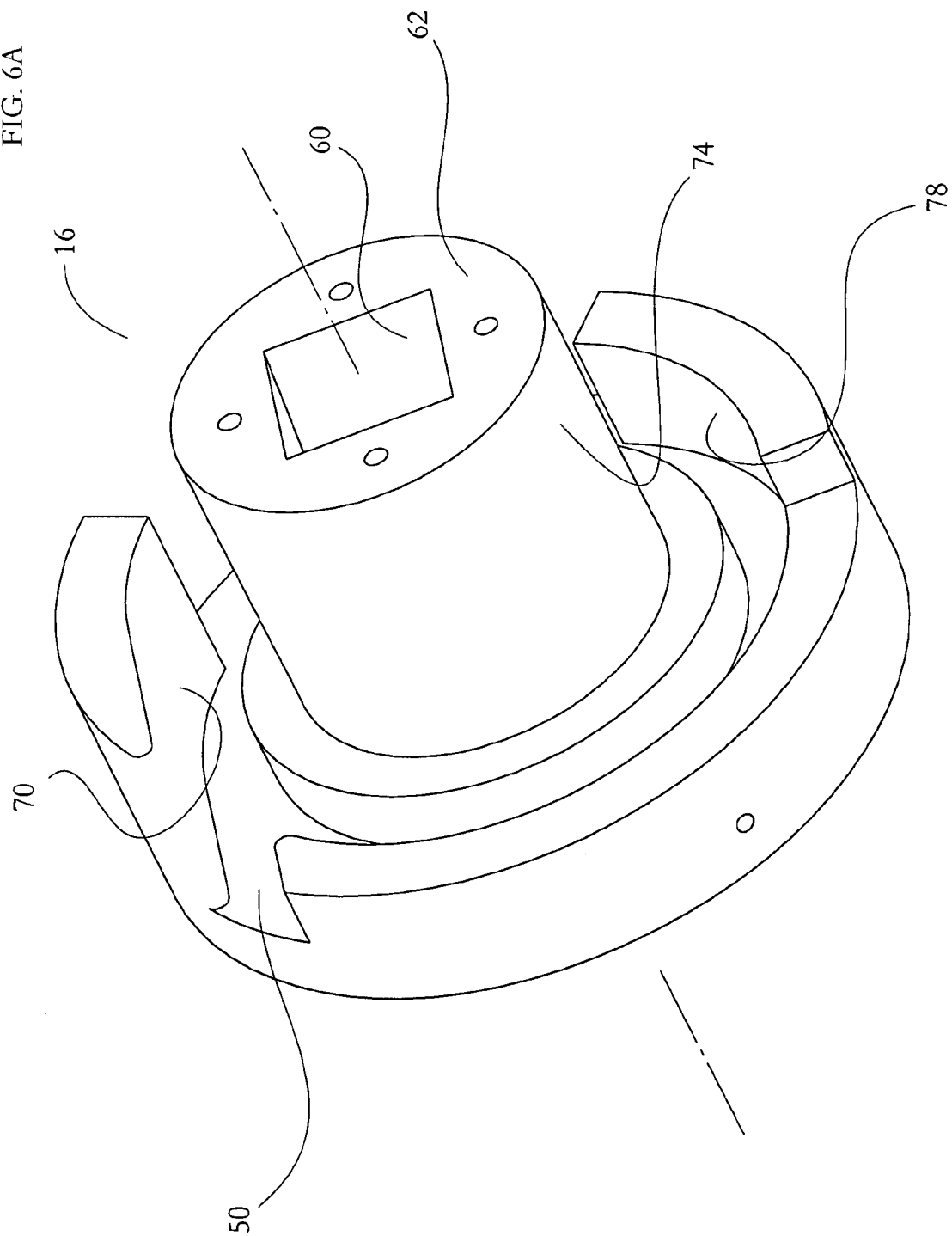
FIG. 6A illustrates a perspective view of a first coupler member of an exemplary embodiment of the present invention.
Figure 7:
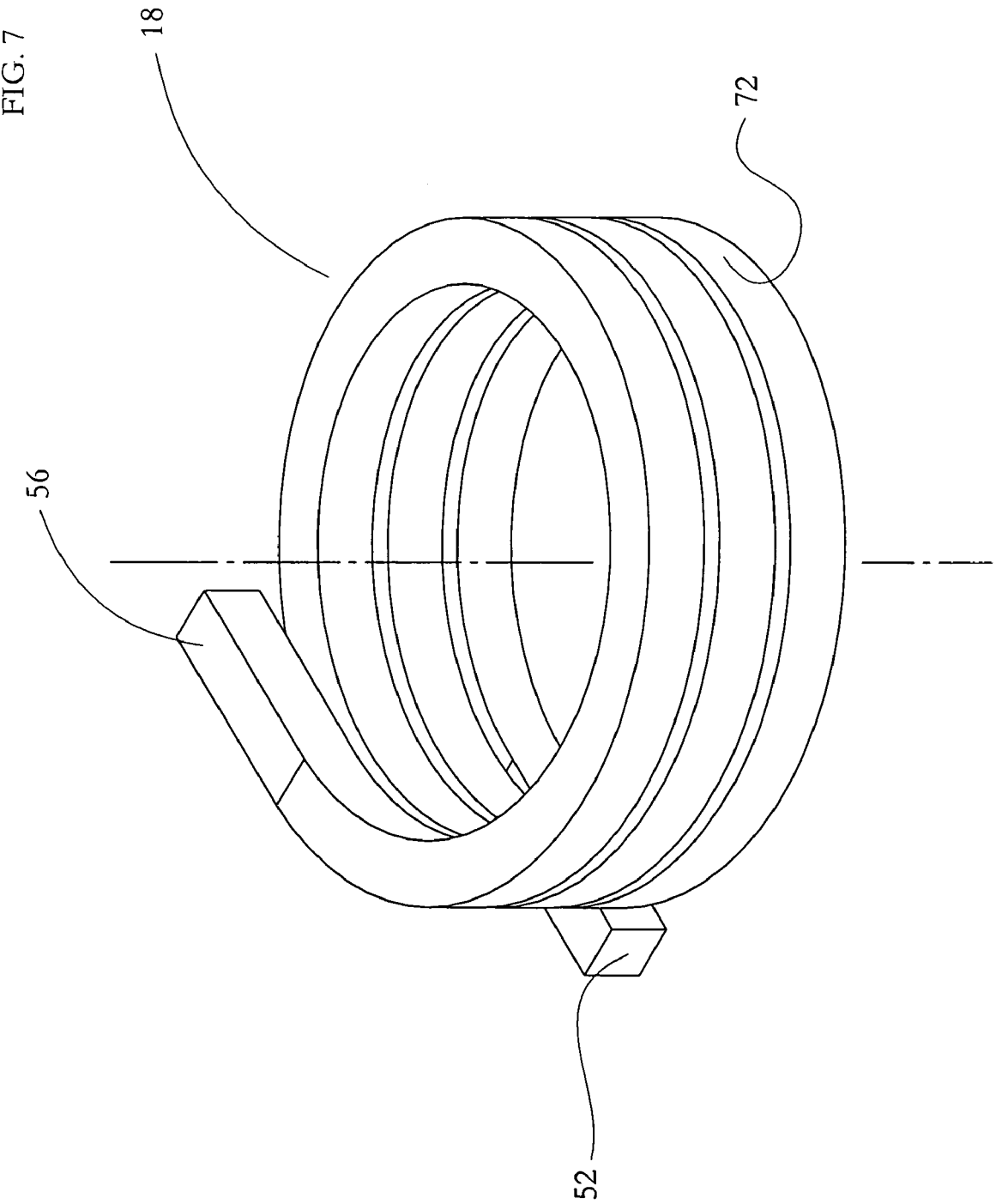
FIG. 7 illustrates a perspective view of a torsional element portion of an exemplary embodiment of the present invention.
Figure 8A:
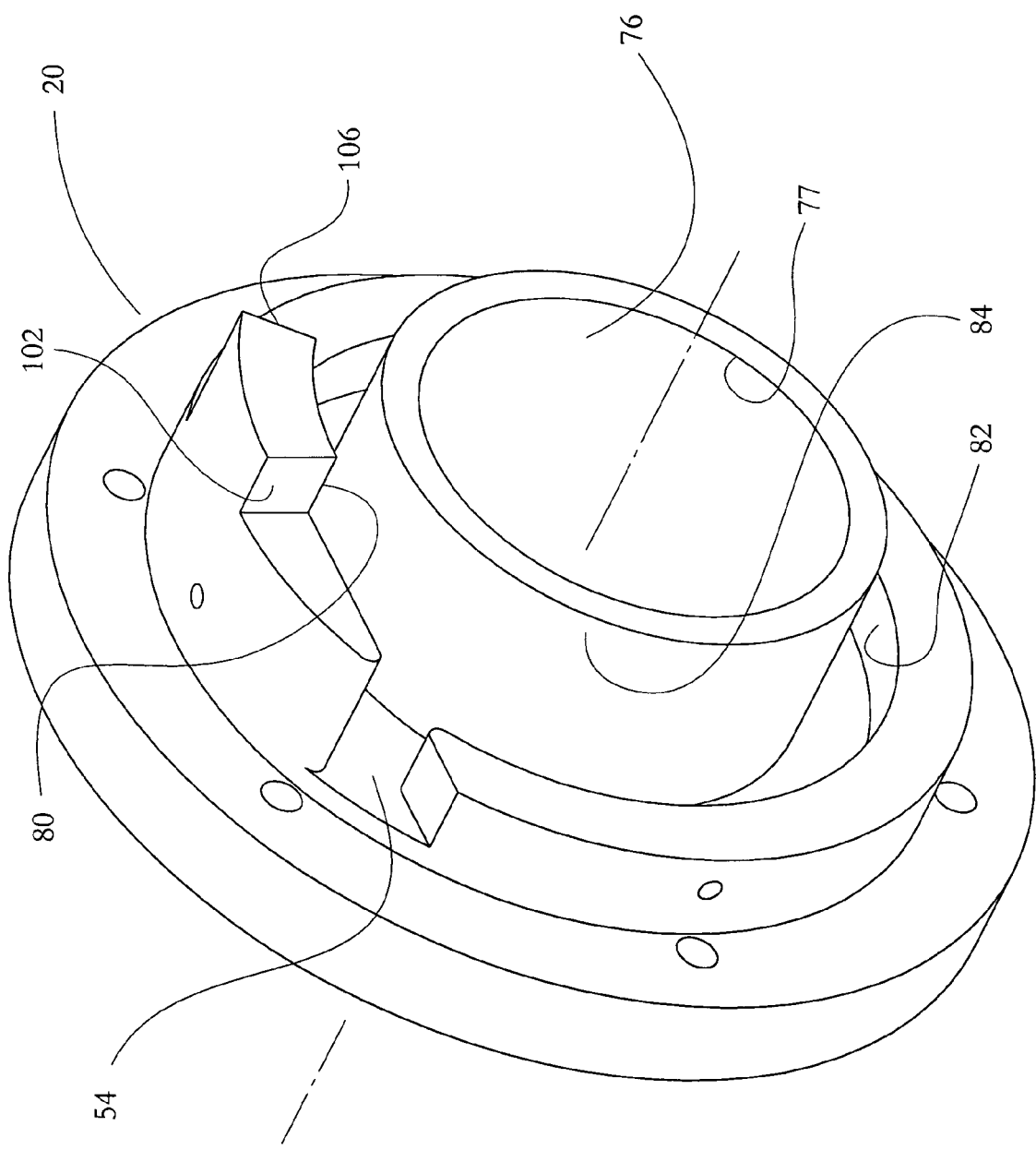
FIG. 8A illustrates a perspective view of a second coupler member of an exemplary embodiment of the present invention.
Figure 8B:
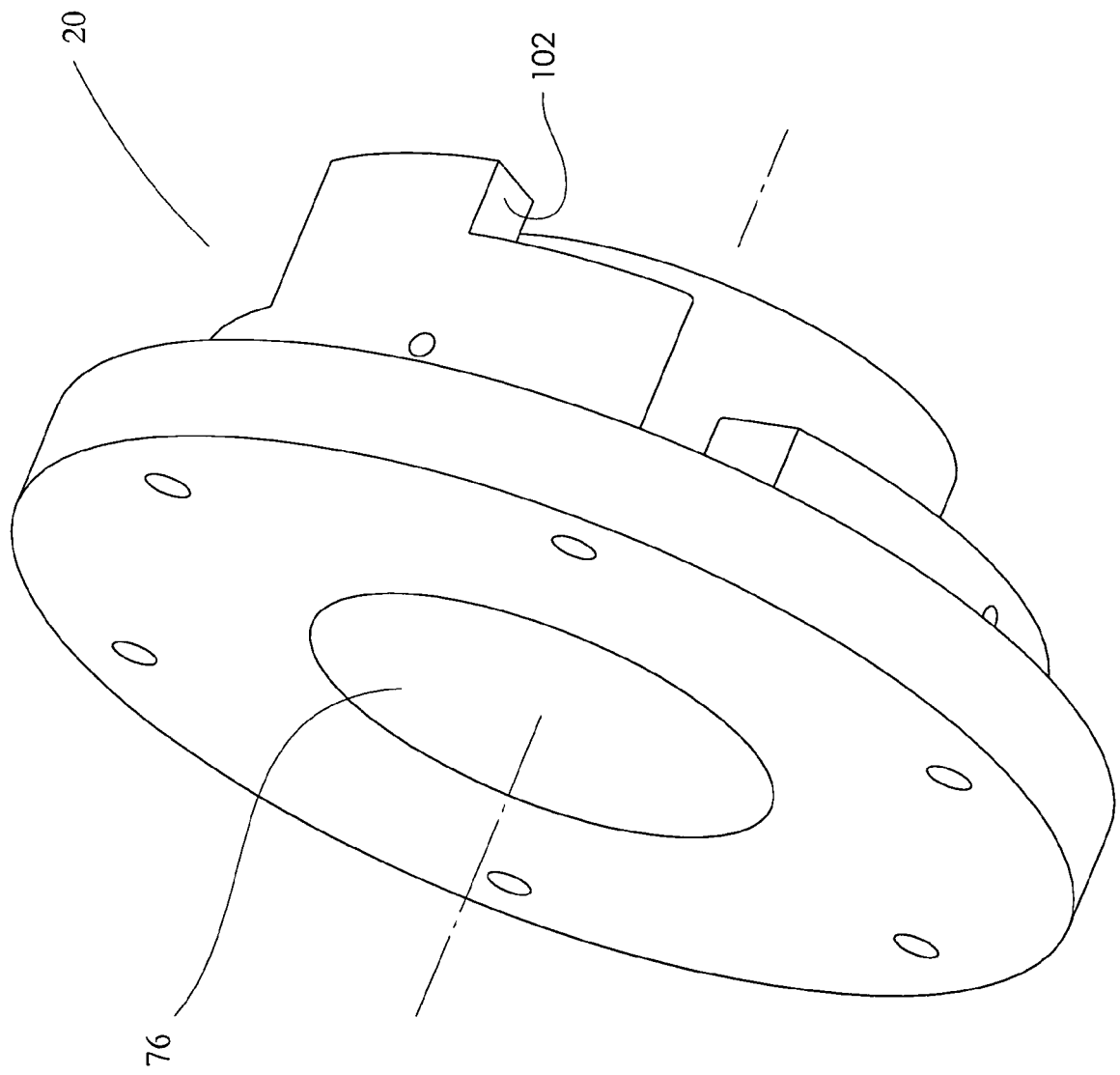
FIG. 8B illustrates another perspective view of the second coupler member of FIG. 8A.
Figure 9A:
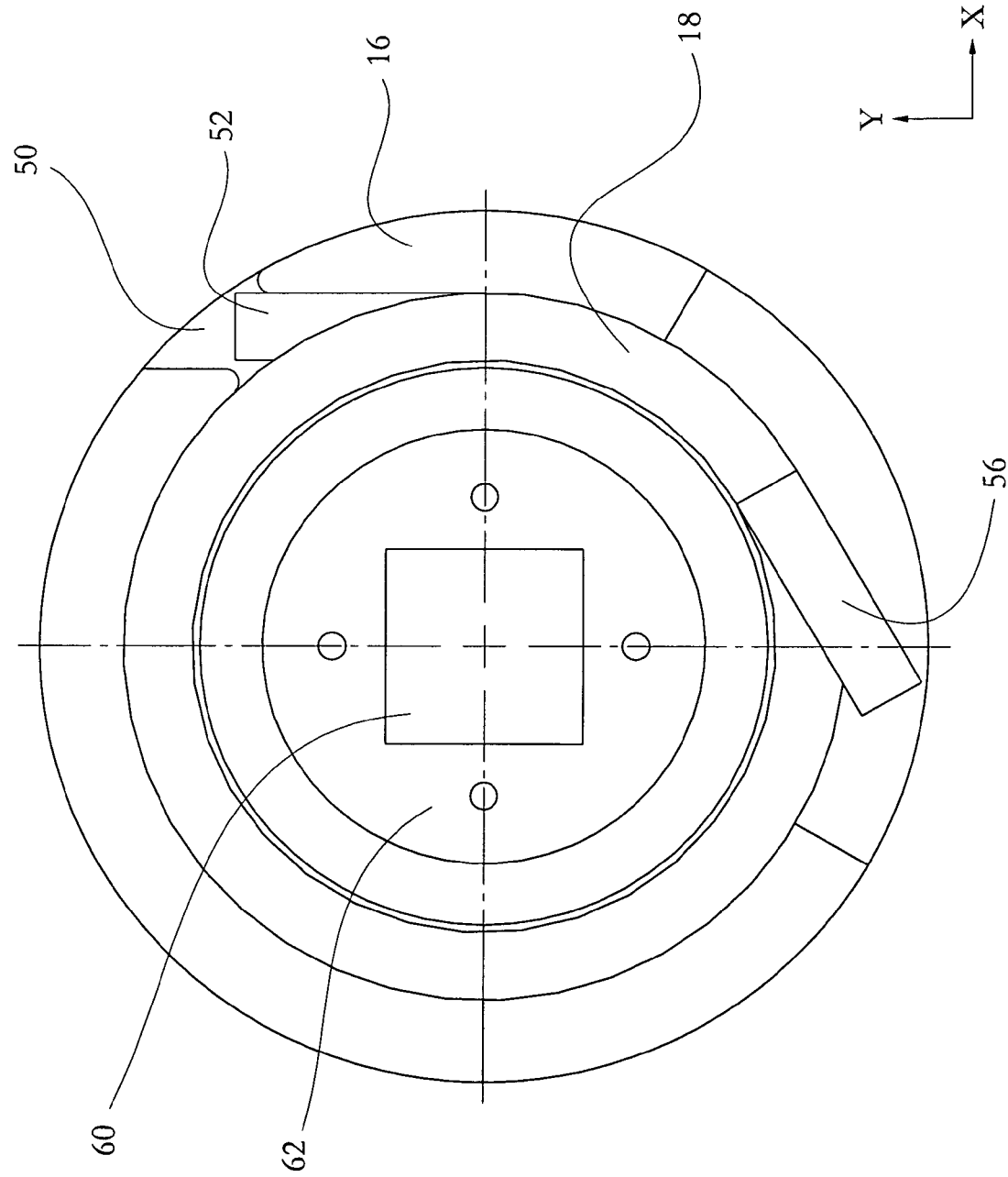
FIG. 9A illustrates an end view of a torsional element and a first coupler member of an exemplary embodiment of the present invention in a first position.
Figure 9B:
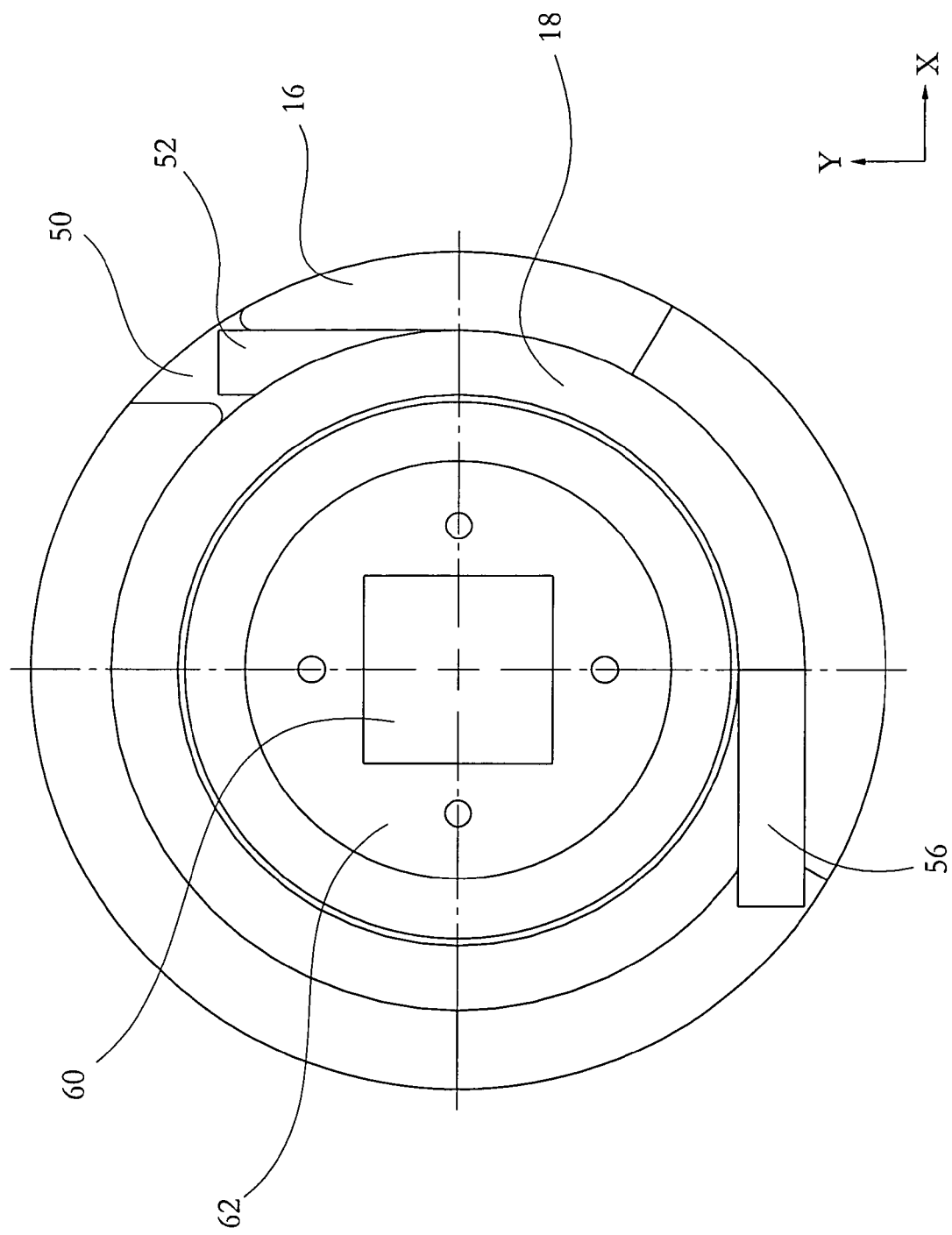
FIG. 9B illustrates another end view of the torsional element and first coupler member of FIG. 9A in a second position.
Figure 9C:
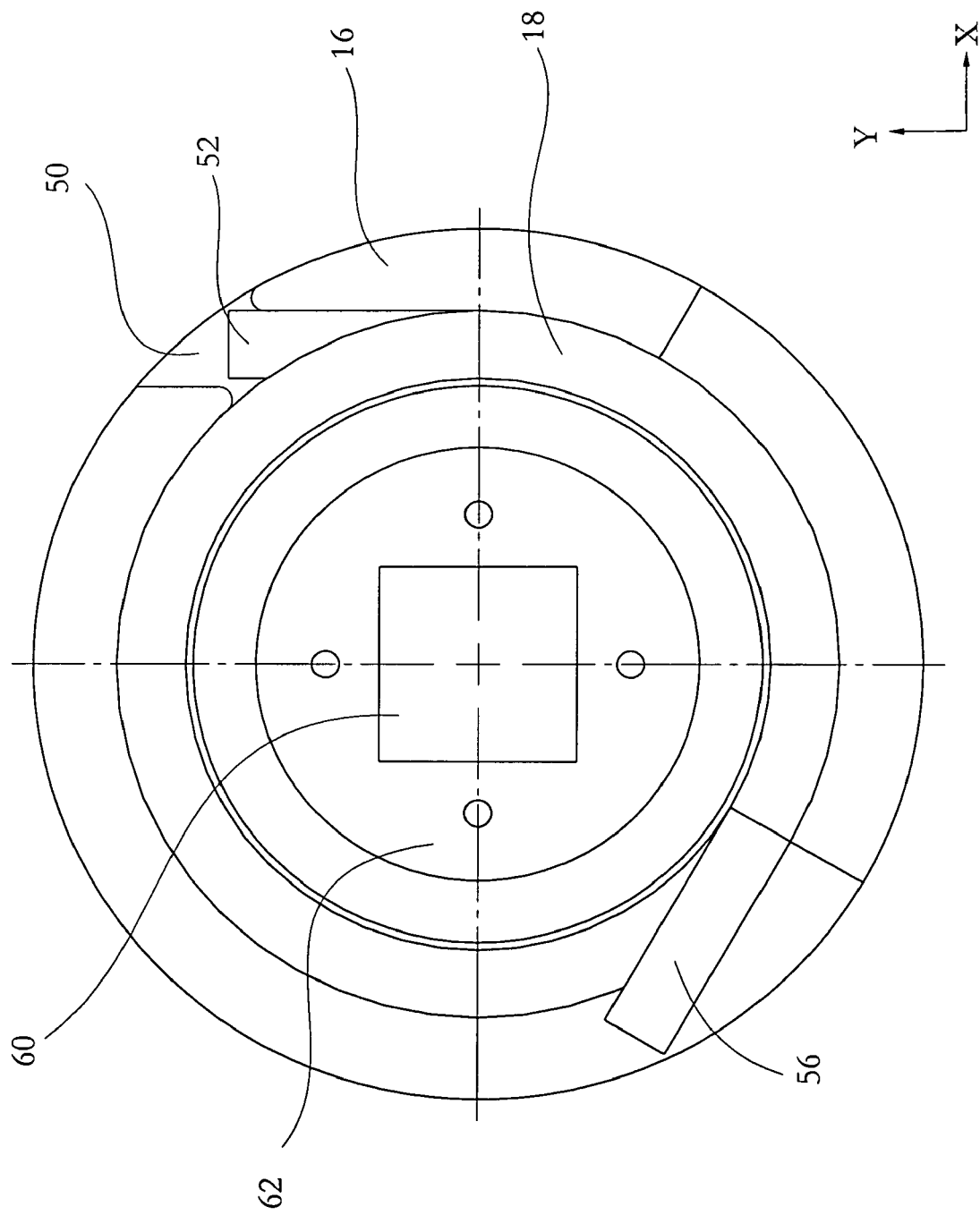
FIG. 9C illustrates another end view of the torsional element and first coupler member of FIGS. 9A-B in a third position.
Figure 10A:
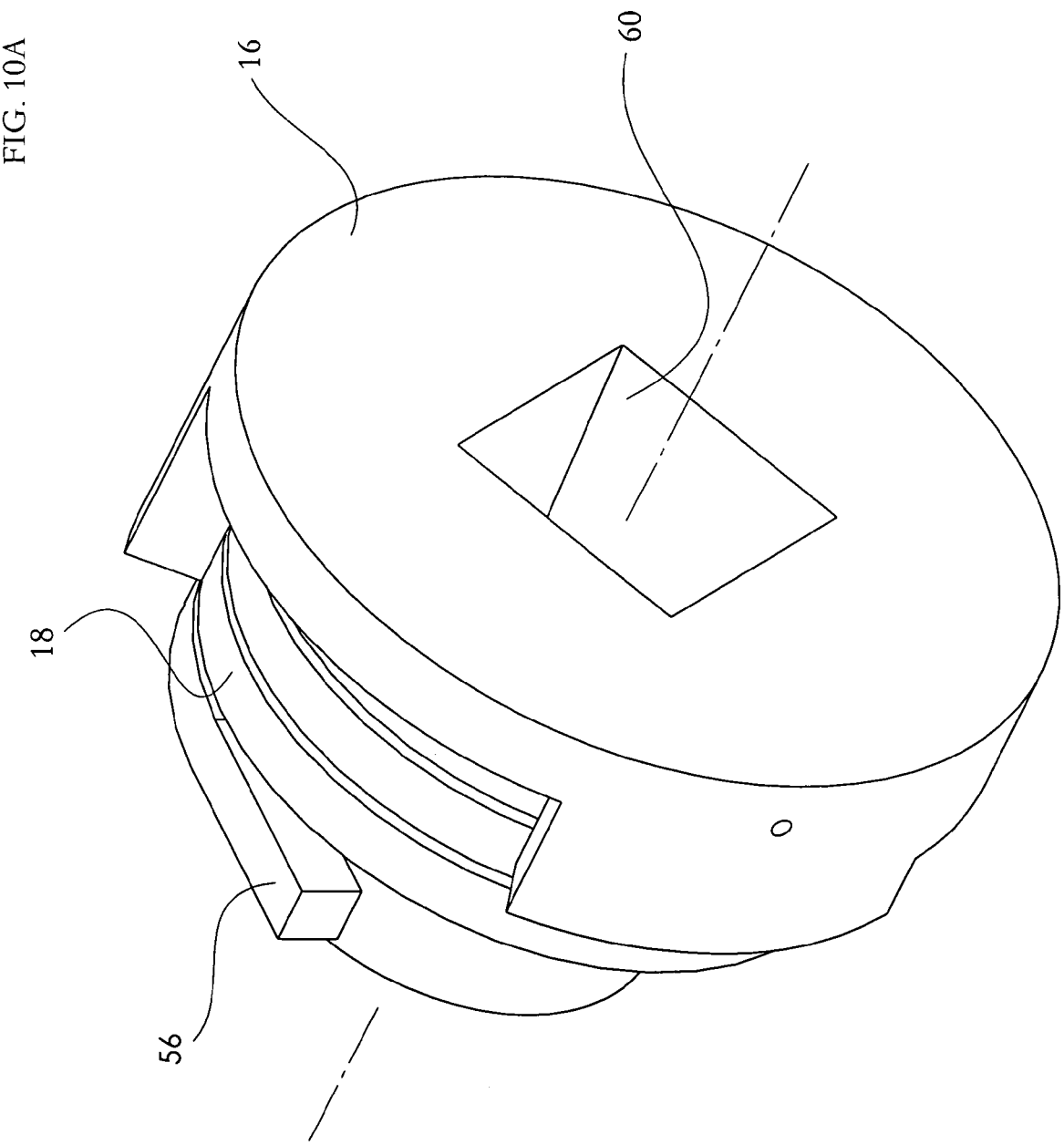
FIG. 10A illustrates a perspective view of a torsional element and a first coupler member of an exemplary embodiment of the present invention.
Figure 10B:
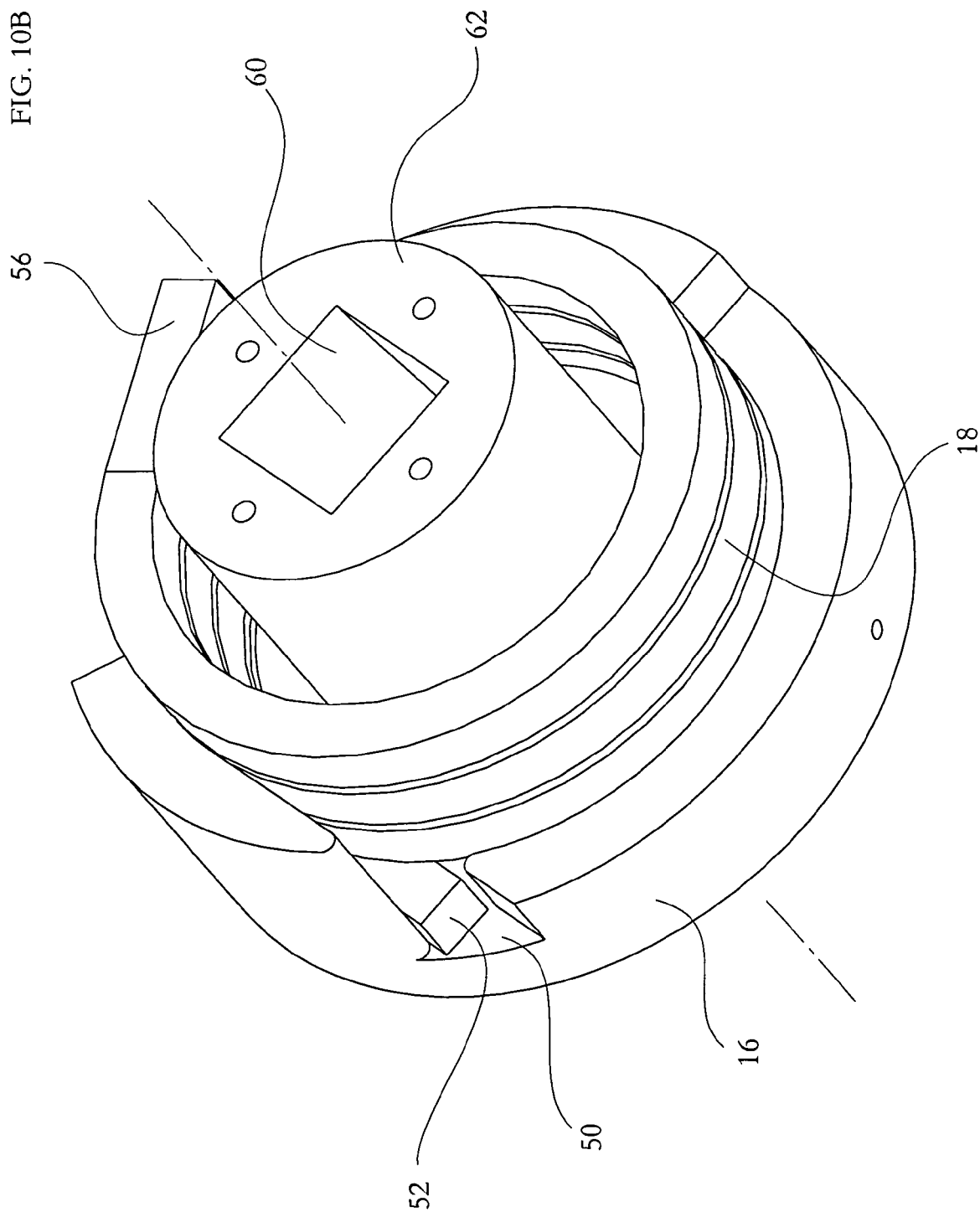
FIG. 10B illustrates another perspective view of the torsional element and first coupler member of FIG. 10A.
Figure 11A:
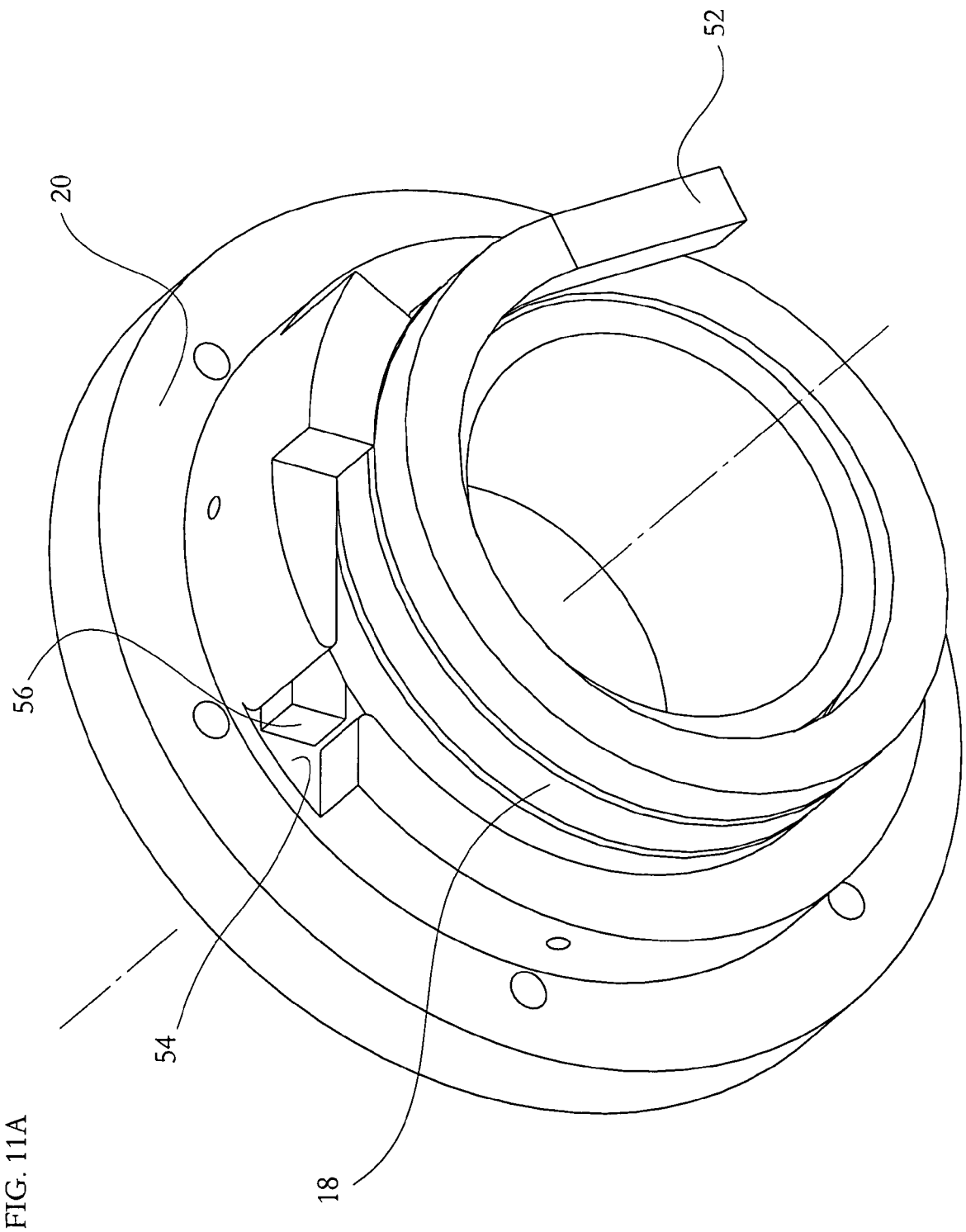
FIG. 11A illustrates a perspective view of a torsional element and a second coupler member of an exemplary embodiment of the present invention.
Figure 11B:
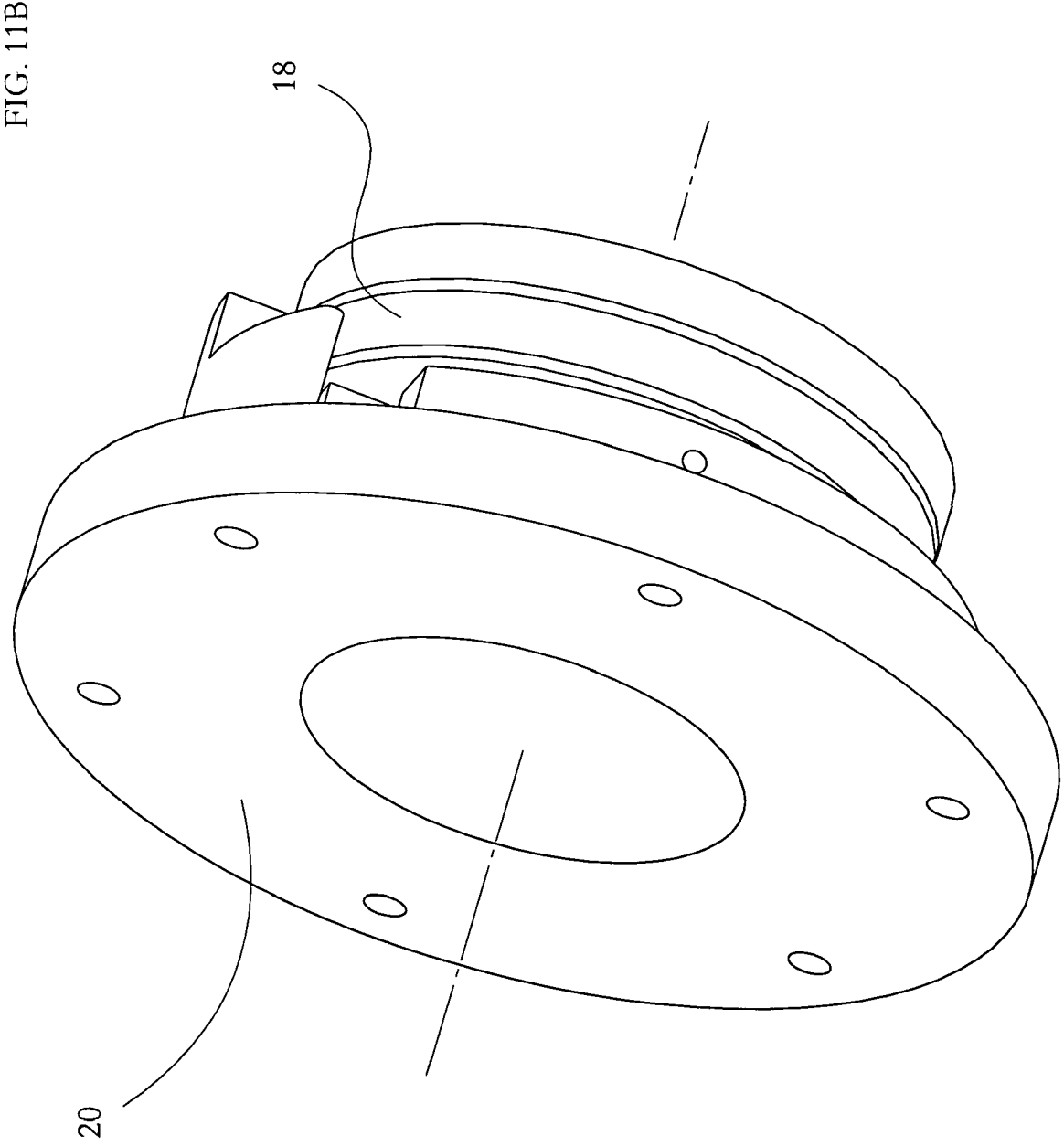
FIG. 11B illustrates another perspective view of the torsional element and second coupler member of FIG. 11A.

FIG. 1A illustrates a side view of an exemplary embodiment of the present invention. FIG. 1B illustrates a side view of a prior art handwheel configuration. FIG. 2A illustrates a perspective view of an exemplary embodiment of the present invention. FIG. 2B illustrates a perspective view of a prior art handwheel configuration. FIG. 3 illustrates an exploded partial perspective view of an exemplary embodiment of the present invention. FIG. 4 illustrates an exploded perspective view of an exemplary embodiment of the present invention. FIG. 5A illustrates a perspective view of an exemplary embodiment of the present invention. FIG. 5B illustrates another perspective view of the exemplary embodiment of FIG. 5A. FIG. 6A illustrates a perspective view of a first coupler member of an exemplary embodiment of the present invention. FIG. 6B illustrates another perspective view of the first coupler member of FIG. 6A. FIG. 7 illustrates a perspective view of a torsional element portion of an exemplary embodiment of the present invention. FIG. 8A illustrates a perspective view of a second coupler member of an exemplary embodiment of the present invention. FIG. 8B illustrates another perspective view of the second coupler member of FIG. 8A. FIG. 9A illustrates an end view of a torsional element and a first coupler member of an exemplary embodiment of the present invention in a first position. FIG. 9B illustrates another end view of the torsional element and first coupler member of FIG. 9A in a second position. FIG. 9C illustrates another end view of the torsional element and first coupler member of FIGS. 9A-B in a third position. FIG. 10A illustrates a perspective view of a torsional element and a first coupler member of an exemplary embodiment of the present invention. FIG. 10B illustrates another perspective view of the torsional element and first coupler member of FIG. 10A. FIG. 11A illustrates a perspective view of a torsional element and a second coupler member of an exemplary embodiment of the present invention. FIG. 11B illustrates another perspective view of the torsional element and second coupler member of FIG. 11A. FIG. 12 illustrates an end view of an exemplary embodiment of the present invention with a handwheel or lever. In the various figures, like members are referenced by like reference numbers.

FIGS. 1A, 2A illustrate side and perspective views of an exemplary embodiment of the present invention showing an exemplary relationship between a coupler 10, a first rotatable member 12 (which may be a component of a brake linkage 14) and a second rotatable member 22. As discussed herein, coupler 10 may indicate a torque. Although illustrated as a shaft, first rotatable member 12 may be comprised of any suitable member including, but not limited to, a shaft, wheel, lever, and gear. Similarly, second rotatable member 22 may be comprised of any suitable member including, but not limited to, a handwheel, shaft, lever, and gear. FIGS. 1B, 2B illustrate side and perspective views of a prior art handwheel/brake configuration. In the prior art device, a hub 11 statically connects a first rotatable member 12 to a conventional handwheel 25.

FIG. 3 illustrates a perspective view of an exemplary embodiment of the present invention. In the illustrated embodiment, coupler 10 may attach to both a first rotatable member 12 and a second rotatable member 22. Coupler 10 may have any number of indicia rings 24, 26, 30, 32 (note that there may be zero or more rings and that such indicia rings may be rings, discs, rectangles or any other suitable shape). Further, such indicia ring(s) 24 may have indicia 28 thereon for indicating a torque or other measurement (see FIGS. 4 and 12). In some embodiments, indicia 28 on indicia ring 24 may cooperate with indicia 28 on another indicia ring 26 such that a torque (or other measurement) may be illustrated. In the embodiment of FIG. 4, indicia 28 on indicia rings 24, 26 cooperate to show a torque (60 foot-pounds as illustrated, for example). In this embodiment, as handwheel 22 is rotated clockwise, coupler 10 is urged to rotate clockwise. If first rotatable member 12 is not constrained, handwheel 22, coupler 10, and first rotatable member 12 will rotate together and the torque indicated will not increase. It is when first rotatable member is constrained that an indicated torque may increase and be indicated on coupler 10 as discussed more fully below. In some embodiments, the minimum torque indicated by indicia 28 may be negative, while in other embodiments the minimum torque may be zero. In yet other embodiments, such as that illustrated in FIG. 3, a minimum torque above zero may be indicated, such as 60 foot-pounds as indicated. In some installations, it may be advantageous to have a minimum torque greater than zero to indicate a minimum input necessary to activate the brake apparatus.

FIG. 4 illustrates an exploded perspective view of an exemplary embodiment of the present invention. Shown are a brake linkage 14, with a first rotatable member 12, first coupler member 16, torsional element 18, second coupler member 20, indicia rings 24, 26, 30, 32, second rotational member 22, washer 42, nut 44, pin (such as a cotter pin, hairpin, split pin, bowtied cotter pin, circle cotter, although any number of suitable devices/pins may be used) 45, and various retaining elements 40 for connecting various members to other members. Note that although pin 45 is illustrated in FIG. 4 in a relaxed condition, in an engaged position, pin 45 may be such as that illustrated in FIG. 2A such that the pin has been inserted through a hole in first rotatable member 12. In the illustrated embodiment, pin 45 may be inserted through such a hole and provide an additional means of restraining one or more of the various components of the invention, such as nut 44 and washer 42, etc. Such nuts 44, or other suitable devices, may present a lateral restraint preventing lateral movement of one or more of the coupler members along a central axis of the first rotatable member.

FIGS. 5A-B illustrate perspective views of an exemplary embodiment of the present invention. Shown is an exemplary configuration of a first coupler member 16, second coupler member 20, and torsional element 18 which may connect the first and second coupler members 16, 20.

In the illustrated embodiment, torsional element 18 is received partly by first coupler member 16 and partly by second coupler member 20. In an exemplary use of such an embodiment, first coupler member 16 may be rotationally fixed to first rotational member 12 while second coupler member 20 may be rotationally fixed with second rotational member 22. Torsional element 18 may be in contact with both coupler members 16, 20 such that when one member 16, 20 is pivoted with respect to the other member 20, 16, the torsional element (a spring in the illustrated embodiment) is twisted or compressed. Thus, as one member 16, 20 is pivoted relative to the other member, torsional member 18 is placed under a torque. Also illustrated is an optional gap 63 which may be occupied by a bushing (as discussed further below). Note that gap 63 may be of any suitable dimension, or may be negated.

FIGS. 6A-B illustrate perspective views of a first coupler member of an exemplary embodiment of the present invention. First coupler member 16 may be shaped so as to be able to receive at least a portion of torsional element 18. In the illustrated embodiment, first coupler member 16 has a first surface 70 which may relate to a first surface 72 of torsional element 18. Further, first coupler member 16 may have a channel/cavity 60 for receiving first rotatable member 12 (herein a squared cross-sectional shape). Of course, channel/cavity 60 and the cross-sectional shape of first rotational member 12 may have any suitable shape including, but not limited to, square, rectangular, round, oval, pentagonal and irregular. Though in some embodiments, the shapes of channel 60 and the cross-sectional shape may correspond, this is not always required. In some embodiments, it may be advantageous to attach coupler 10 (or some portion of coupler 10) to first rotatable member 12. Such attachment may be temporary or permanent and may be accomplished through any suitable means including, but not limited to, screwing, bonding, welding, and gluing. In some embodiments, coupler 10 (or some portion of coupler 10) may be formed unitary with first rotatable member 12. Also illustrated is a first surface 62 of first rotatable member 16 which may be a connection surface with other components.

FIG. 7 illustrates a perspective view of a torsional element portion of an exemplary embodiment of the present invention. Shown are an exemplary torsional element 18 (herein a spring, although any suitable element(s) may be utilized including, but not limited to, elastomers, rubbers, ceramics, and springs). In this embodiment, torsional element 18 has a first end 52 and a second end 56.

FIGS. 8A-B illustrate perspective views of a second coupler member of an exemplary embodiment of the present invention. Second coupler member 20 may have a first slot 54 for receiving an end 56 of torsional element 18, for example. Also illustrated is a channel/slot 76 which may receive a portion of first coupler member 16, i.e., shaft 74. Surface 77 of channel/slot 76 may also be in contact with a corresponding surface of second coupler member 20 or a bushing as discussed further herein.

FIGS. 9A-C illustrate end views of a torsional element and a first coupler member of an exemplary embodiment of the present invention in a first position, second position, and third position, respectively. As illustrated, as torsional element 18 is twisted, it may twist about shaft 74 of first rotational member 16. In this embodiment, even as torsional element 18 is pivoted, first end 52 of torsional element 18 may stay in approximately the same position of slot 50 even as second end 56 rotates. In some embodiments, torsional element 18 is permitted to slide along wall(s) 70, 78 of first coupler member 16 (and/or along wall(s) 80, 82, 84 of second coupler member 20) such that the spring is able to rotate, and its ends are able to move and/or slide with respect to both first and second coupler member 16, 20.

FIGS. 10A-B illustrate perspective views of the torsional element and a first coupler member of FIGS. 9A-C.

FIGS. 11A-B illustrate perspective views of a torsional element and a second coupler member of an exemplary embodiment of the present invention. Shown are an exemplary combination of second coupler member 20 and torsional element 18. Also shown is an exemplary slot 54 in second coupler member 20 which may receive a second end 56 of torsional element 18.

FIG. 12 illustrates an end view of an exemplary embodiment of the present invention with a handwheel 110 or lever 112 illustrated in phantom. Illustrated is an exemplary configuration of indicia rings 30, 32 with indicia 28 thereon for indicating a torque or other measurement on a handwheel, lever, or other device. Note that FIGS. 2A and 12 show a face of said handwheel 110 such that at least one set of indicia is viewable when looking at a face of the handwheel.

Note that in the reference embodiments, some elements/components may be fixed (either temporarily or permanently) to other members. For example, in some embodiments, indicia ring 24 and/or indicia ring 30 may be in a fixed rotational relationship with first coupler member 16. Similarly, in some embodiments, indicia ring 26 and/or indicia 32 may be in a fixed relation to second coupler member 20. Various members of the present invention may also sleeve each other such as shaft 74 of first coupler member 16 which may be received by channel/slot 76 of second coupler member 20. In some embodiments bushings and other components may be added to the embodiment to further facilitate the motions of the various componentry.

For example, a bushing may be positioned on a surface of first coupler member 16 or a surface of second coupler member 20, such as to prevent wear. Bushings may also provide a buffer between first coupler member 16 and torsional element 18. As are many of the components of the present invention, bushings are optional and may or may not be incorporated into another component.

Torsional element 18 may be prestressed/pretorqued such that when a torque of less than a predetermined level is applied, a rotation of one of the rotational members, 12, 22, the other respective member 22, 12 pivots. In other embodiments, torsional element 18 may have no prestress/pretorque such that a torque is always indicated on the torque indicator. Note that in some embodiments, only an active torque is indicated, i.e., a torque must be applied to one of the rotational members 12, 22 in order to read the torque and when the torque is removed, the two rotational members will not be under any torque differential (unless there is a predetermined amount of a minimum torque such as by applying a prestress/pretorque to torsional element 18). That is, in some embodiments, the torque indicated on the indicia is a torque differential is reported.

In some embodiments, a pretorque may be applied to the coupler such that if the second member/shaft is pivoted, the first member/shaft will also pivot. In some embodiments, a constraint may affect the pivotability of the first member/shaft. In some embodiments, the constraint may increase as the first rotatable member is rotated such that as it is rotated, more and more torque is required to pivot the first rotatable member. As the impact of the constraint grows, eventually the pretorque level is reached and a torque differential is created as the second member/shaft is pivoted/rotated with respect to the first member/shaft. In some embodiments, a maximum torque differential may be incorporated into the coupler such that once the maximum torque is reached, the first and second members/shafts rotate together with no increase in torque differential.

In some embodiments, predetermined stops may be incorporated into one or more members such as first stop member/surface 100 of first coupler member 16 and second stop member/surface 102 of second coupler member 20 as illustrated in FIG. 5B. Other stops may also be incorporated such as first stop member/surface 104 of first coupler member 16 and second stop member/surface 106 of second coupler member 20. In some embodiments, a stop may be incorporated such that below a predetermined torque level, a surface (or other member) of first coupler member 16 (such as surface 104 for example) may be in contact with a surface (or other member) of second coupler member 20 (such as surface 106) such that below the predetermined torque level, surfaces 104, 106 are in contact and impact each other and the torsional element has little or no impact on the torque. In other embodiments (with or without the stop of the preceding sentence), a stop may be incorporated such that at a maximum predetermined torque one or more surfaces (or other portion) of first coupler member 16 may be in contact with one or more surfaces (or other portion) of second coupler member 20 such that above the predetermined torque level, surfaces (such as, for example, surfaces 100, 102 may be in contact and impact each other and the torsional element has little or no impact on the torque. For example, a protrusion on first coupler member 16 may engage with a protrusion on second coupler member 20 only at a predetermined torque level. I.e., if the torque is below the predetermined level, first coupler member 16 and second coupler member 20 rotate at least somewhat independently, but at a predetermined threshold, they will rotate together and the torsional element is nullified.

Note that coupler (including torsional element and fixed element combination) may be designed and defined based on an ergonomic range of motion, such as of a human. In some embodiments, the coupler may be designed and configured such that the rotational angular differential between the shafts may be limited to less than 360 degrees. In some embodiments, the rotational angular differential between the shafts may be limited to less than 180 degrees. In some embodiments, the rotational angular differential between the shafts may be limited to less than 60 degrees.

Note that the indicia rings discussed herein (or any other components of a particular embodiment) may be a separate component from other elements of coupler 10 or unitary therewith (i.e., indicia may be painted, etched, bonded etc. to any suitable surface or element of coupler 10). Further, indicia 28 may include any suitable information/graphics such as, for example, foot-pounds of torque, arrows, warning labels, etc. As known in the art, retaining elements 40 can be comprised of any suitable means including, but not limited to, tape, glue, bonding, screws, bolts, hooks and loops, welding, and paint.

The coupler may provide the operator/user a reference value of the torque being manually applied to the hand brake by the operator. The coupler provides tactile feedback to the user in conjunction with a visual indication of the torque as it is being applied. The coupler may be used in various configurations for installation both on rotating hand wheel or ratchet type lever brake installations. The coupler may provide a torque reference in either (or both) circumferentially around the axis of rotation and/or axially at the front about the centerline of rotation. The ability to have one or more sets of indicia at one or more of these locations (or other suitable locations) allows the operator the ability to determine the torque input from the normal operating position and provides an alternative reading position that can be viewed from the ground by other personnel in attendance.

In some embodiments, a minimum torque input may be required to initiate tactile feedback from the coupler. Such a minimum torque may be preset at any desired level, and in some embodiments may be set at 60 foot-pounds, while in other embodiments it may be set at 50 foot-pounds, etc. Some United States railroad regulations consider 60 foot-pounds to be the rail industry accepted "norm" for a minimal hand brake application. In some embodiments, a maximum torque input may be incorporated into a design of a coupler in accordance with the present invention. In some embodiments, the coupler may accommodate a maximum torque input of 125 foot-pounds, which is considered to be equal to the maximum design requirement for a freight car hand brake system per the Association of American Railroads. In some embodiments, the coupler may have physical stops at both the low end of torque input, i.e., 60 foot-pounds for example, as well as at the high end, i.e., 125 foot-pounds.

Due to the configuration of the coupler, the indicated torque input is the torque at the input of the brake, the reading will be accurate regardless of the diameter of the hand wheel or arm length of the ratchet.

As a torque is applied to the hand brake, the coupler registers the force reacting against a calibrated internal component which, in turn, rotates against the resistance of the railcar brake mechanism as the brakes are being applied. This calibrated reaction provides a contemporaneous "snap shot" indication of the torque as it is being applied.

The external snap shot view of the applied torque may provide in any suitable increments and grade. In some embodiments, the torque may be indicated in 15 foot-pound increments/graduations (i.e., 60 to 120 foot-pounds). Such indicia of the torque may be located and configured in any desired manner including, but not limited to, those illustrated in the various figures. The indicia may be placed circumferentially and/or axially to the rotation of the coupler. The torque indicating decals (indicia) may be positioned so as to be visible from the normal operating position on the railcar and from a position on the ground, or other suitable locations. When the operator releases his hold on the wheel/lever hand brake, the torque indication may drop to zero, or to a minimum torque if the embodiment has a minimum torque other than zero. If the coupler has a predetermined minimum torque of 60 foot-pounds, for example, the coupler may indicate only that the torque is below 60 foot-pounds without indicating an exact torque. Each subsequent application of force (and thereby torque) by the operator again provides an indication of the torque being applied to the hand brake.

Note that in many existing rail cars, and even for cars currently being manufactured, the configuration and mechanism of the hand brake system is configured such that when the hand wheel/lever are engaged by a user, the brake advances, but when the operator releases the hand wheel/lever, the brake system itself does not revert back to a zero condition, but rather stays at the applied torque level (or a level close to the applied torque level allowing for minor losses in slacking down to the next notch in the ratchet means). In practice, when an operator is engaging the hand brakes of a railcar, the operator increases the force/torque until "sufficient" force/torque has been applied as determined by the operator to prevent unintended movement of the parked railcar(s).

The torque indication may also provide the operator with a value for future reference against which he can cross reference the tactile sensations/feedback of the brake application against the indicated torque. This tactile feedback is valuable as a reference when the operator cannot see the indicia due to poor lighting conditions or when he is operating out of proper position. The operator may also reference the torque that was required to set the hand brake with sufficient force, in his opinion, in the event of run away railcar(s) or personal injury. A primary cause of personal injury results from the over-application of torque/force leading to overexertion by the operator, an event which can easily be avoided through the use of a coupler in accordance with the present invention.

Some embodiments of the present invention may be configured to be retrofit to existing railcar brake mechanisms including, but not limited to, those meeting the requirements of Association of American Railroads such as AAR S-475. The coupler for a hand wheel type installation may be configured to mate to the hand wheel hub taper defined in AARS-475 Section 8.0. The coupler operating envelope for a hand wheel type installation may be configured to comply with AAR S-475 Section 7.0, or as otherwise desired.

Torque indicators of the present invention may be made of any suitable material including, but not limited to, plastic, wood, aluminum, metal, carbon fiber, ceramics, acrylics, acrylic glasses, glass and rubber.

Torque indicators of the present invention may be made of any suitable dimensions and thicknesses. For example, torque indicators may be shaped to accurately fit over the outer edges of a hand brake shaft of a railroad car while simultaneously accommodating a hand wheel. In some embodiments, the torque indicator may be manufactured to specifically meet the requirements of the American Railroad Administration for hand brake assemblies including those using hand wheels.

Although various components of the present invention may be illustrated as being of a particular shape for convenience, such components may be of any suitable shape, configuration, orientation, etc. Further, any number of additional components may be added to a particular embodiment to accommodate a particular need, including, but not limited to, the addition of one or more grommets, washers, gaskets or other spacing means between two or more of the components of the invention such as between blades, or between blades and one (or more) of the tension members.

Note that there may be possible advantages of sloping or cutting away part of the material of one or more components, i.e., to utilize less material, or to decrease the weight of the device. As one of ordinary skill in the art would recognize, some advantage can be gained in using less material, but some minimum of material must be maintained to provide sufficient structural integrity for the device to be useful.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A torque indictor for a hand brake on a freight car, said torque indicator comprising:
    a first rotatable member having a first end, a second end, a first member cross sectional shape, and a central axis about which said first rotatable member is able to pivot,
    a second rotatable member having a first end, a second end, a second member cross sectional shape, and a central axis about which said second rotatable member is able to pivot,
    a coupler engaged with both said first rotatable member and said second rotatable member wherein said coupler indicates a torque between said first rotatable member and said second rotatable member when at least one of said first rotatable member and said second rotatable member is pivoted with respect to the other via said coupler,
    wherein said coupler has a first end and a second end spaced a distance from said coupler first end and wherein said coupler has a central axis
    wherein said second rotatable member is pivotable by sixty degrees or less with respect to said first rotatable member and wherein said coupler limits said pivoting between said first and second rotatable members.

2. The torque indicator of claim 1, wherein said second rotatable member is a hand wheel.

3. The torque indicator of claim 1, wherein said coupler comprises a first coupler member in fixed rotational relationship with said first rotatable member and a second coupler member in fixed rotational relationship with said second rotatable member and a torsional element.

4. The torque indicator of claim 1, further comprising one or more lateral restraint
    wherein said lateral restraint prevents lateral movement of at least a portion of said coupler along said central axis.

5. The torque indicator of claim 4, wherein said lateral restraint is a nut which screws onto a threaded portion of said first rotatable member.

6. The torque indicator of claim 1, further comprising at least one torsional element.

7. The torque indicator of claim 1, wherein said first rotatable member is a tapered shaft with a generally square cross-sectional shape.

8. The torque indicator of claim 1, further comprising a linkage and a brake system wherein upon rotation of said first rotatable member a brake is engaged and wherein said coupler is attached to said brake system by said linkage.

9. The torque indicator of claim 1, wherein said coupler is coaxial with both said first rotatable member and said second rotatable member.

10. The torque indicator of claim 6, wherein at least one of said torsional element is prestressed and said torque indicator has a minimum torque and a maximum torque.

11. A torque indictor for a hand brake on a freight car, said torque indicator comprising:
a first rotatable member having a first end, a second end, a first member cross sectional shape, and a central axis about which said first rotatable member is able to pivot,
a second rotatable member having a first end, a second end, a second member cross sectional shape, and a central axis about which said second rotatable member is able to pivot,
a coupler engaged with both said first rotatable member and said second rotatable member wherein said coupler indicates a torque between said first rotatable member and said second rotatable member when at least one of said first rotatable member and said second rotatable member is pivoted with respect to the other via said coupler,
wherein said coupler has a first end and a second end spaced a distance from said coupler first end and wherein said coupler has a central axis
wherein said coupler is a sleeve at least partially surrounding a portion of said first rotatable member and extends at least partially into said second coupler member.

12. A torque indictor for a hand brake, said torque indicator comprising:
a coupler mountable with both a first rotatable member and a second rotatable member, said coupler having at least one torsional element which is engaged with both said first rotatable member and said second rotatable member wherein said coupler indicates a torque between said first rotatable member and said second rotatable member
wherein said coupler has at least two indicia of torque, a first indicia which is parallel to a central axis of said coupler and a second indicia which is orthogonal to said central axis.

13. The torque indicator of claim 12, wherein said torsional element is prestressed at a predetermined level.

14. The torque indicator of claim 13, wherein said torsional element predetermined level is at least fifty foot-pounds of torque.

15. The torque indicator of claim 12, wherein said second indicia is viewable when looking at a face of said second rotatable member.

16. A device for reporting a torque differential between two rotatable shafts, said device comprising:
a first rotatable shaft,
a second rotatable shaft,
a coupler connecting said first rotatable shaft and said second rotatable shaft having at least one torsional element,
wherein as first rotatable shaft is rotated, it becomes constrained and wherein below a minimum activating torque, as said second rotatable shaft is pivoted, said first rotatable shaft is caused to pivot without additional torque above said minimum activating torque between said first and second rotatable shafts.

17. The device of claim 16, further comprising two or more sets of indicia for indicating a torque between said first and second rotatable shafts wherein one of said two or more sets of indicia is orthogonal to at least one other of said two or more sets of indicia.

18. The device of claim 16, wherein said coupler limits a rotational differential of said second rotatable member relative to said first rotatable member.

19. The device of claim 16, wherein said second rotatable shaft is limited by said coupler to a rotational differential of less than three hundred sixty degrees relative to said first rotatable shaft.

20. The device of claim 16, wherein said second rotatable shaft is limited by said coupler to a rotational differential of eighty degrees or less relative to said first rotatable shaft.

21. The device of claim 16, further comprising one or more lateral restraint
wherein said lateral restraint prevents lateral movement of at least a portion of said coupler along said central axis.

22. The device of claim 16, wherein a first coupler member of said coupler is fixed in relation to said first rotatable shaft and a second coupler member is fixed in relation to said second rotatable shaft and at least one of said at least one torsional element is in contact with both said first coupler member and said second coupler member.

23. The device of claim 16, wherein said coupler has a first coupler member and a second coupler member and at least one of said at least one torsional element connects said first coupler member and said second coupler member and at least one of said at least one torsional element is a spring.

* * * * *